(12) United States Patent
Oike

(10) Patent No.: US 8,908,065 B2
(45) Date of Patent: Dec. 9, 2014

(54) SOLID STATE IMAGING PROCESSING SYSTEMS AND METHOD FOR PROVIDING SIGNAL CORRECTION OF PIXEL SATURATION ERRORS

(75) Inventor: Yusuke Oike, Kanagawa (JP)

(73) Assignee: Sony Corporation, Tokyo (JP)

( * ) Notice: Subject to any disclaimer, the term of this patent is extended or adjusted under 35 U.S.C. 154(b) by 557 days.

(21) Appl. No.: 12/082,873

(22) Filed: Apr. 15, 2008

(65) Prior Publication Data

US 2008/0291296 A1 Nov. 27, 2008

(30) Foreign Application Priority Data

May 24, 2007 (JP) ................................ P2007-137540

(51) Int. Cl.
*H04N 5/217* (2006.01)
*H04N 5/228* (2006.01)
*H04N 9/68* (2006.01)
*H04N 5/359* (2011.01)
*H04N 9/04* (2006.01)

(52) U.S. Cl.
CPC ............. *H04N 9/045* (2013.01); *H04N 5/3591* (2013.01)
USPC .......................... 348/241; 348/222.1; 348/234

(58) Field of Classification Search
None
See application file for complete search history.

(56) References Cited

U.S. PATENT DOCUMENTS

| | | | |
|---|---|---|---|
| 5,801,773 A * | 9/1998 | Ikeda | 348/229.1 |
| 6,825,884 B1 * | 11/2004 | Horiuchi | 348/362 |
| 6,924,841 B2 * | 8/2005 | Jones | 348/294 |
| 7,489,345 B2 * | 2/2009 | Fukumoto | 348/222.1 |
| 2007/0273772 A1 * | 11/2007 | Shirai | 348/223.1 |
| 2009/0153696 A1 * | 6/2009 | Suwabe et al. | 348/223.1 |

FOREIGN PATENT DOCUMENTS

| | | |
|---|---|---|
| JP | 2003-209850 | 7/2003 |
| JP | 2004-363666 | 12/2004 |
| KR | 2001-050876 | 6/2001 |
| KR | 2003-005009 | 1/2003 |

OTHER PUBLICATIONS

Nayar et al., "High Dinamic Range Imaging: Spatially Varying Pixel Exposures", IEEE Conference on Computer Vision and Pattern Recognition, 2000.

* cited by examiner

*Primary Examiner* — Justin P Misleh
(74) *Attorney, Agent, or Firm* — Robert J. Depke; The Chicago Technology Law Group, LLC

(57) ABSTRACT

A solid-state imaging device includes a pixel array unit in which unit pixels are arranged in a matrix shape and a signal processing circuit that obtains a first video signal and performs processing for combining the first and second video signals. The signal processing circuit includes judging means that judges whether a pixel of interest in the pixel array unit is a pixel to be saturated during an exposure period, calculating means that sets the pixel of interest as a correction pixel and calculates a correction amount on the basis of a luminance value of the second video signal of a peripheral pixel of the correction pixel, and correcting means that applies the correction amount to a luminance value of the first video signal of the correction pixel to thereby correct a noise signal amount due to photo-charges leaking from the peripheral pixel into the correction pixel.

21 Claims, 19 Drawing Sheets

FIG. 12A

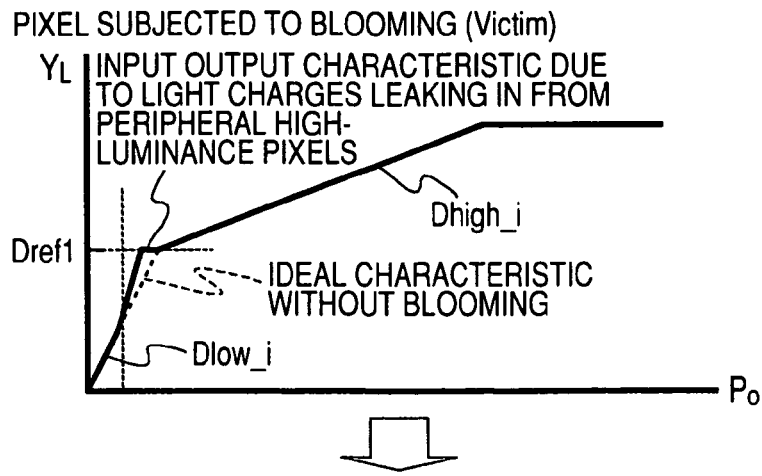

PIXEL SUBJECTED TO BLOOMING (Victim)
INPUT OUTPUT CHARACTERISTIC DUE TO LIGHT CHARGES LEAKING IN FROM PERIPHERAL HIGH-LUMINANCE PIXELS

FIG. 12B

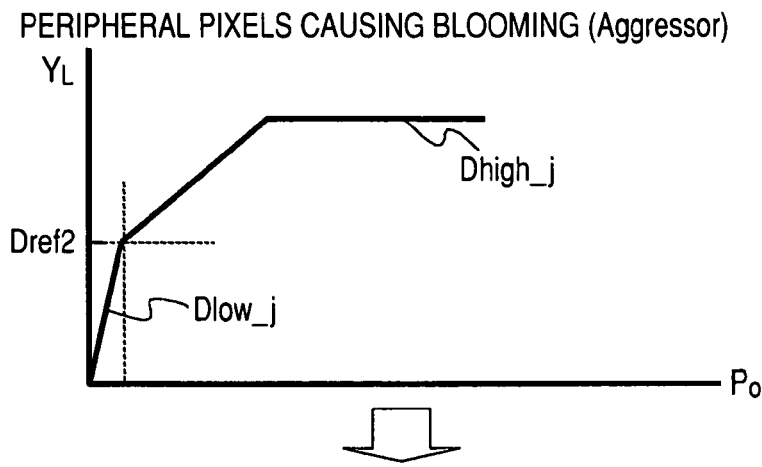

PERIPHERAL PIXELS CAUSING BLOOMING (Aggressor)

FIG. 12C

CALCULATE SUM OF BLOOMING AMOUNTS Dblm_i FROM PERIPHERAL PIXELS $$Dblm\_i = \sum_j A\_j (Dhigh\_j - Dref2)$$

FIG. 12D

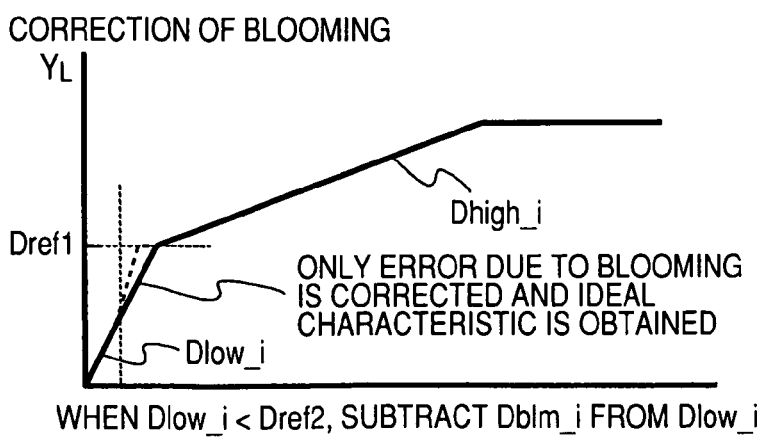

CORRECTION OF BLOOMING

ONLY ERROR DUE TO BLOOMING IS CORRECTED AND IDEAL CHARACTERISTIC IS OBTAINED

WHEN Dlow_i < Dref2, SUBTRACT Dblm_i FROM Dlow_i

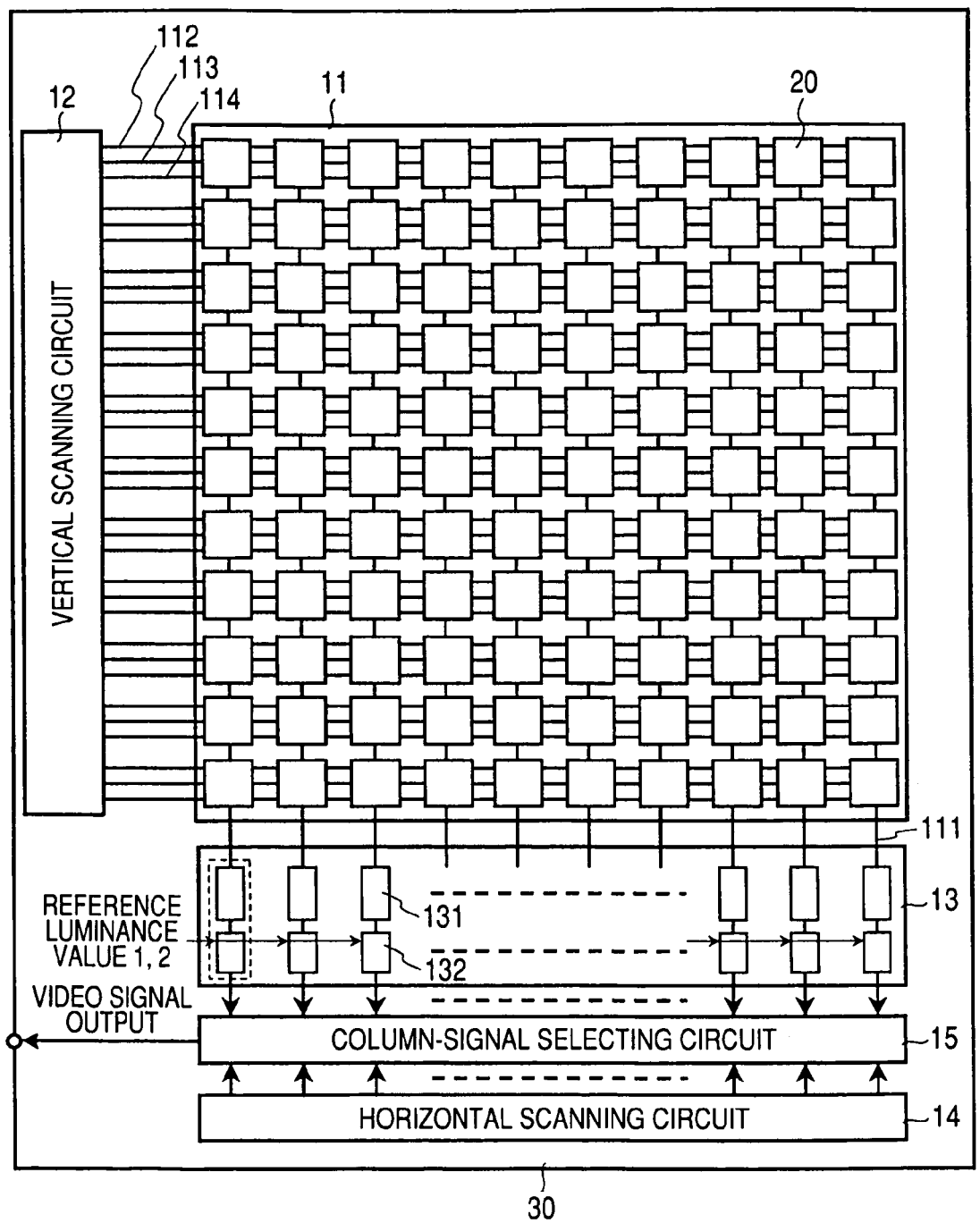

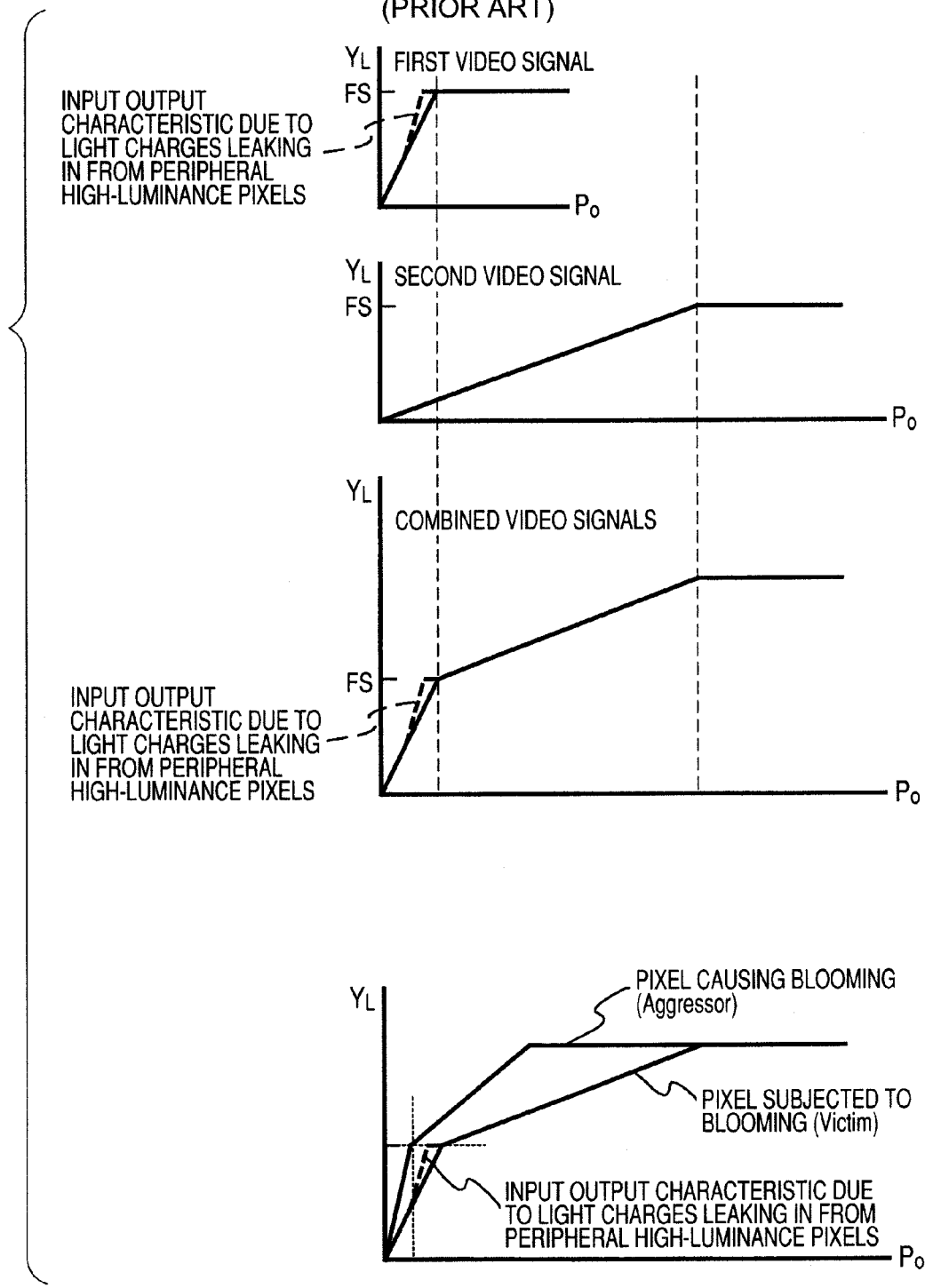

SOLID STATE IMAGING PROCESSING SYSTEMS AND METHOD FOR PROVIDING SIGNAL CORRECTION OF PIXEL SATURATION ERRORS

CROSS-REFERENCES TO RELATED APPLICATIONS

The present invention contains subject matter related to Japanese Patent Application JP 2007-137540 filed in the Japanese Patent Office on May 24, 2007, the entire contents of which being incorporated herein by reference.

BACKGROUND OF THE INVENTION

1. Field of the Invention

The present invention relates to a solid-state imaging device, a signal processing device and a signal processing method for the solid-state imaging device, and an imaging apparatus.

2. Description of the Related Art

In recent years, in a CCD (Charge Coupled Device) image sensor and an amplification-type image sensor known as solid-state imaging elements suitable for applications such as a video camera and a digital still camera, a pixel size is further reduced through an increase in the number of pixels and a reduction in an image size at high sensitivity.

On the other hand, in general, solid-state imaging elements such as a CCD image sensor and a CMOS (Complementary Metal Oxide Semiconductor) image sensor tend to be used under various environments such as the indoors and the outdoors and in the daytime and at night. When the solid-state imaging elements are used under such environments, it is necessary to adjust an exposure period by, for example, controlling charge accumulation time in a photoelectric conversion element and set sensitivity to an optimum value according to a change in external light and the like.

As a method of expanding a dynamic range of the CMOS image sensor, there have been proposed, for example, a method of combining plural frames photographed in plural exposure periods as shown in FIGS. 19A and 19B (see, for example, JP-A-2004-363666 (hereinafter referred to as Patent Document 1)) and a method of expanding a dynamic range by applying different exposure periods to respective rows of a pixel array as shown in FIGS. 20A and 20B (see, for example, "High Dynamic Range Imaging: Spatially Varying Pixel Exposures" IEEE Conference on Computer Vision and Pattern Recognition 2000 (hereinafter referred to as Non-Patent Document 1)).

In the following explanation, the former method is referred to as a wide dynamic range method 1 and the latter method is referred to as a wide dynamic range method 2. In the wide dynamic range methods 1 and 2, plural images with different sensitivities are acquired as a first video signal, a second video signal, and the like. As an example, the acquired plural video signals are added up and combined to obtain an image with a wide dynamic range.

In FIGS. 19A and 19B and FIGS. 20A and 20B, the abscissa $P_O$ indicates the intensity of incident light and the ordinate $Y_L$ indicates an output of a sensor (a light receiving unit). FS represents a saturation level of the sensor. With one video signal, it is difficult to obtain an output signal with a saturation level equal to or higher than FS.

SUMMARY OF THE INVENTION

In the wide dynamic range methods 1 and 2, when a low-luminance signal is acquired, it is likely that a pixel saturated at high luminance is present around a low-luminance pixel. A signal can be obtained from the saturated high-luminance pixel by separately reading out the signal. However, charges overflow during a saturated state and leak into the low-luminance pixel as blooming.

A state of occurrence of blooming is shown in FIG. 21. Intense light is made incident on one of adjacent pixels, faint light is made incident on the other, and a light receiving unit 1 on which the intense light is made incident is in a saturated state. In this case, charges generated by the light made incident on the light receiving unit 1 are not accumulated in the light receiving unit 1 and a part of the charges leak into a light receiving unit 2. This phenomenon is referred to as blooming. In this explanation, the pixel causing blooming is referred to as Aggressor and the pixel subjected to blooming is referred to as Victim to distinguish the pixels.

Examples of timing of occurrence of blooming in the wide dynamic range methods 1 and 2 are shown in FIGS. 22A and 22B.

FIG. 22A shows the example of the timing in the wide dynamic range method 1. When a high-luminance pixel and a low-luminance pixel are adjacent to each other, the high-luminance pixel is in a saturated state at a stage when a first video signal is obtained. On the other hand, the low-luminance pixel is not saturated and accumulates charges. Therefore, the high-luminance pixel is an Aggressor and causes blooming and the low-luminance pixel having the first video signal is a victim and suffers the influence of the blooming. It is likely that blooming also occurs in second and third video signals depending on incidence intensity of light.

FIG. 22B shows the example of the timing in the wide dynamic range method 2. Different exposure periods are set for a set of two rows. For example, different exposure periods are set for an nth row and an n+1th row and different exposure periods are set for an n+2th row and an n+3th row. When high-luminance light is made incident on a set of the nth row and the n+1th row, the nth row is saturated. It is likely that the n+1th row is also saturated before an exposure period for signal readout is started. Pixels in these rows are Aggressors and cause blooming and pixels, for example, n+2th row, adjacent thereto, on which low-luminance light is made incident, are Victims and suffer the blooming.

Because of the influence of the blooming, a signal of the low-luminance pixels is affected by leak-in of photo-charges depending on a state of the high-luminance pixels around the low-luminance pixels. Therefore, a nonlinear characteristic depending on a state of the peripheral pixels occurs in a low-luminance area. As a result, deterioration in an image quality is caused.

When images in a wide dynamic range are combined, as shown in FIG. 23, a relation between input and output of a signal in the low-luminance area breaks down because of a state of the peripheral pixels. This causes luminance shift and color drift to deteriorate an image quality.

In particular, in the case of a color image, a blooming amount is different depending on a sensitivity difference due to a wavelength of incident light and a type of a color filter of a pixel. This causes color drift and deteriorates an image quality. Since the blooming amount is different depending on a state of the peripheral pixels, it is difficult to prevent this problem of the color drift with white balance processing for multiplying each of colors with a different gain coefficient.

Therefore, it is desirable to provide a solid-state imaging device, a signal processing device and a signal processing method for the solid-state imaging device, and an imaging apparatus that control nonlinearity due to blooming and make it possible to improve image quality.

According to an embodiment of the present invention, there is provided a solid-state imaging device including a pixel array unit in which unit pixels including photoelectric conversion elements for converting light signals into signal charges are arranged in a matrix shape. In obtaining a first video signal imaged at first sensitivity and a second video signal imaged at second sensitivity and performing processing for combining the first and second video signals, the solid-state imaging device compares a level of a luminance value of the first video signal and a level of a luminance value of the second video signal of a pixel of interest in the pixel array unit with respect to a reference luminance value to thereby judge whether the pixel of interest is a pixel to be saturated during an exposure period. When it is judged that the pixel of interest is the pixel to be saturated, the solid-state imaging device sets the pixel of interest as a correction pixel. The solid-state imaging device calculates a correction amount on the basis of a luminance value of the second video signal of peripheral pixels of the correction pixel and applies the correction amount obtained by the calculation to the luminance value of the first video signal of the correction pixel to thereby correct a noise signal amount due to photo-charges leaking into the correction pixel from the peripheral pixels.

The solid-state imaging device acquires a luminance value of light made incident on a pixel (Aggressor) saturated during an exposure period according to a wide dynamic ranging operation for performing processing for combining the first and second video signals. The solid-state imaging device predicts a blooming amount from a luminance value of the second video signal of the saturated pixel (Aggressor) making use of the fact that a blooming amount (a noise signal amount due to leaking-in photo-charges) of the saturated pixel is proportional to sensitivity of the saturated pixel. The solid-state imaging device calculates a correction amount from the blooming amount. The solid-state imaging device can correct the blooming amount of the correction pixel (Victim) by applying the correction amount to the luminance value of the first video signal of the pixel suffering the blooming (Victim).

According to the embodiment of the present invention, it is possible to control nonlinearity due to blooming by correcting a blooming amount of a pixel suffering the blooming and accurately represent a gradation of an image. Therefore, it is possible to improve an image quality.

BRIEF DESCRIPTION OF THE DRAWINGS

FIGS. 12A to 12D are diagrams for explaining processing in executing the correction processing with the software;

FIG. 13 is a system diagram showing a configuration example of a CMOS image sensor according to a second embodiment of the present invention;

FIG. 23 is a diagram for explaining that, when images in a wide dynamic range are combined, a relation between input and output of a signal in a low-luminance area breaks down because of a state of peripheral pixels.

DESCRIPTION OF THE PREFERRED EMBODIMENTS

Embodiments of the present invention will be hereinafter explained with reference to the accompanying drawings.

First Embodiment

Figure 1:
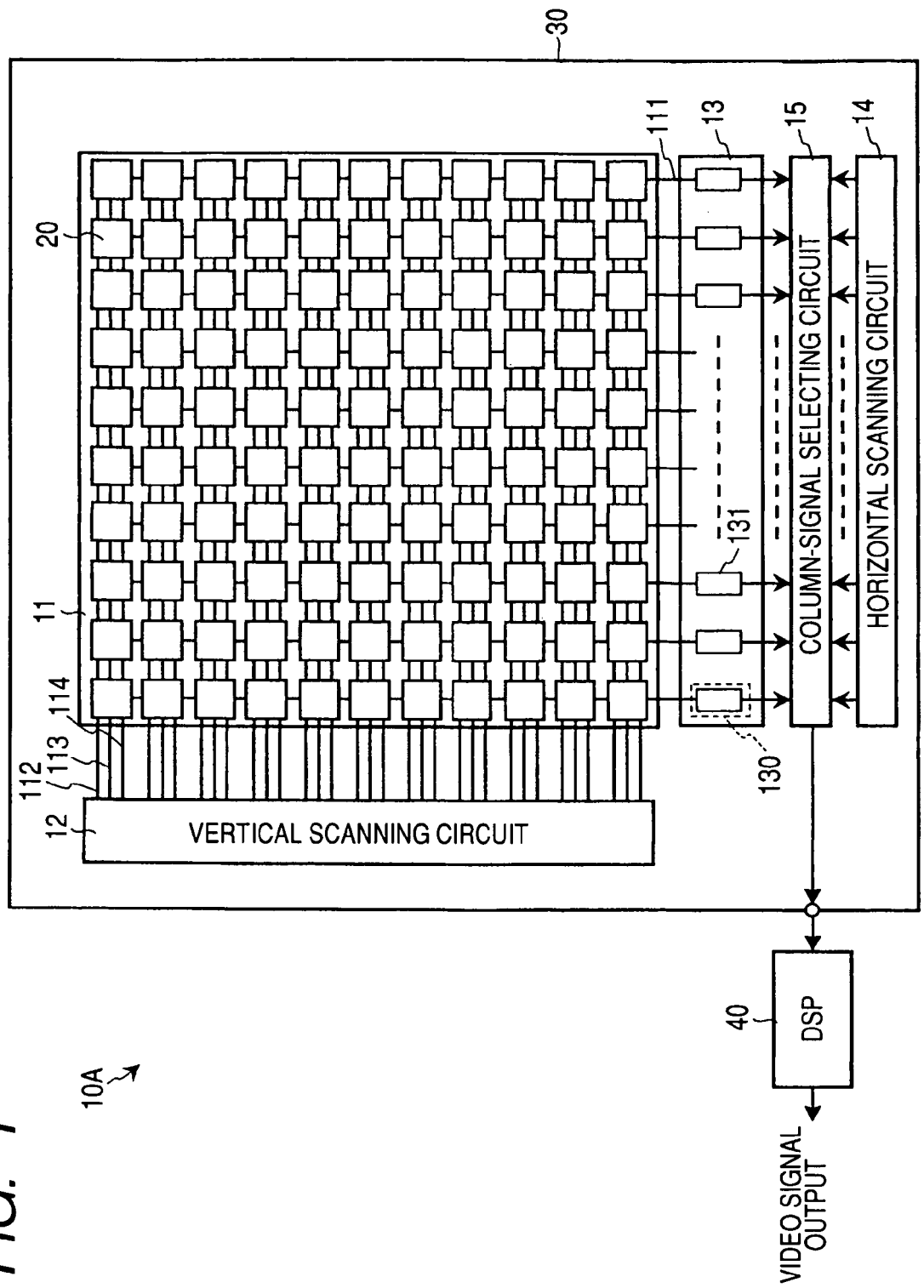
FIG. 1 is a system diagram showing a configuration example of a CMOS image sensor according to a first embodiment of the present invention.

FIG. 1 is a system diagram showing a configuration example of a solid-state imaging element, for example, a CMOS image sensor according to a first embodiment of the present invention.

As shown in FIG. 1, a CMOS image sensor 10A according to this embodiment includes a pixel array unit 11 in which unit pixels (hereinafter simply referred to as "pixels" as well) 20 including photoelectric conversion elements are two-dimensionally arranged in a matrix shape and peripheral circuits of the pixel array unit 11.

The peripheral circuits of the pixel array unit 11 are, for example, a vertical scanning circuit 12, a column circuit 13, a horizontal scanning circuit 14, and a column-signal selecting circuit 15. The peripheral circuits are integrated on a chip (a semiconductor substrate) 30 on which the pixel array unit 11 is integrated. On the outside of the chip 30, a signal processing circuit, for example, a DSP (Digital Signal Processor) circuit 40 is provided.

With respect to the pixel array of the matrix shape of the pixel array unit 11, vertical signal lines 111 are wired for respective pixel columns, driving control lines, for example, transfer control lines 112, reset control lines 113, and selection control lines 114 are wired for respective pixel rows.

The vertical scanning circuit 12 includes a shift register and an address decoder. While scanning the respective pixels 20 in the pixel array unit 11 in the vertical direction (the up to down direction) in row units for each of an electronic shutter row and a readout row, the vertical scanning circuit 12 performs, for the electronic shutter row, an electronic shutter operation for sweeping signals of the pixels 20 in the row and performs, for the readout row, a readout operation for reading out signals of the pixels 20 in the row.

Although not shown in the figure, the vertical scanning circuit 12 includes a readout scanning system for performing a readout operation for reading out signals of the respective pixels 20 in the readout row while selecting the pixels 20 sequentially in row units and an electronic shutter scanning system for performing an electronic shutter operation on the same row (electronic shutter row) by time corresponding to shutter speed before the readout scanning by the readout scanning system.

A period from timing when unnecessary charges of a photoelectric conversion unit are reset by shutter scanning by the electronic shutter scanning system to timing when signals of the pixels 20 are read out by readout scanning by the readout scanning system is an accumulation period (an exposure period) in one unit of signal charges in the pixels 20. In other words, the electronic shutter operation is an operation for performing reset (sweeping) of signal charges accumulated in the photoelectric conversion unit and starting accumulation of signal charges anew after the reset.

The column circuit 13 includes a set of unit column circuits 130 including, for example, signal processing circuits 131 arranged in the respective pixel columns of the pixel array of the pixel array unit 11, i.e., in a one to one correspondence relation with the pixel columns. The column circuit 13 applies predetermined signal processing to signals outputted from the respective pixels 20 in the readout row, which is selected by the vertical scanning by the vertical scanning circuit 12, through the vertical signal lines 111 and temporarily holds the pixel signals after the signal processing.

The unit column circuits 130 are provided in the respective unit columns of the pixel array of the pixel array unit 11. However, it is also possible to provide the unit column circuits 130 in respective sets of plural columns.

In the unit column circuits 130, the signal processing circuits 131 apply, for example, to pixel signals outputted from the respective pixels 20 in a selected row through the vertical signal lines 111, various kinds of signal processing such as noise reduction processing for reducing, with CDS (Correlated Double Sampling) processing, reset noise and fixed pattern noise peculiar to pixels such as threshold fluctuation of an amplifying transistor 24 (see FIG. 2), signal combination processing for wide dynamic ranging, and AD conversion processing for converting an analog signal into a digital signal.

The horizontal scanning circuit 14 includes a shift register or an address decoder. The horizontal scanning circuit 14 horizontally scans the unit column circuits 130 of the column circuit 13, which are sequentially arranged in the respective pixel columns of the pixel array unit 11.

The column-signal selecting circuit 15 includes a horizontal selection switch and a horizontal signal line. The column-signal selecting circuit 15 sequentially outputs the signals of the pixels, which are temporarily held by the column circuit 13, to the outside of the chip 30 in synchronization with the horizontal scanning by the horizontal scanning circuit 14.

Timing signals and control signals as references of operations of the vertical scanning circuit 12, the column circuit 13, the horizontal scanning circuit 14, and the like are generated by a not-shown timing control circuit.

The DSP circuit 40 performs, in addition to various signal processing concerning camera processing, correction processing characterizing this embodiment, i.e., correction processing for acquiring a luminance value of incident light of a saturated pixel (Aggressor) according to the wide dynamic ranging operation and correcting a value of a pixel suffering blooming (Victim) making use of the fact that a blooming amount is proportional to sensitivity of the saturated pixel. Details of the correction processing are described later.

In this example, the DSP circuit 40 is provided on the outside of the chip 30. However, like the vertical scanning circuit 12, the column circuit 13, the horizontal scanning circuit 14, the column-signal selecting circuit 15, and the like, the signal processing circuits such as the DSP circuit 40 having the correction processing function can also be integrated on the chip 30 on which the pixel array unit 11 is integrated.

Pixel Circuit

Figure 2:
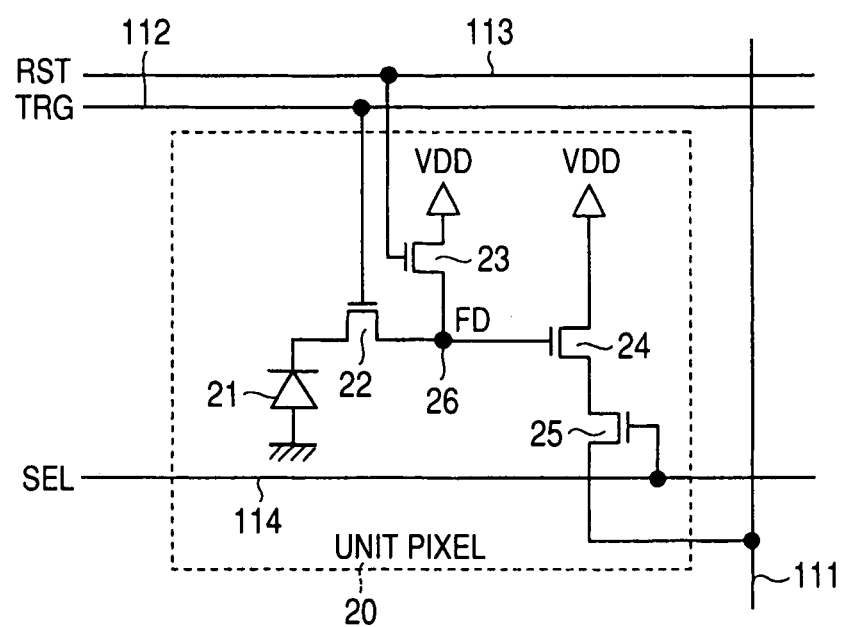
FIG. 2 is a circuit diagram showing an example of a circuit configuration of a unit pixel.

FIG. 2 is a circuit diagram showing an example of a circuit configuration of the unit pixel 20.

The unit pixel 20 according to this circuit example is a pixel circuit including, in addition to a photoelectric conversion element, for example, an embedded photodiode 21, four transistors such as a transfer transistor (a transfer element) 22, a reset transistor 23, an amplifying transistor 24, and a selecting transistor 25. In this example, for example, N-channel MOS transistors are used as the transistors 22 to 25. However, the transistors 22 to 25 are not limited to the N-channel MOS transistors.

The transfer transistor 22 is connected between a cathode electrode of the photodiode 21 and a floating diffusion capacitor (hereinafter referred to as FD unit) 26. The transfer transistor 22 transfers signal charges (electrons) photoelectrically converted by the photodiode 21 and accumulated in the transfer transistor 22 to the FD unit 26 according to a transfer pulse TRG given to a gate electrode (a control electrode) thereof. The FD unit 26 functions as a charge-voltage converting unit that converts a signal charge into a voltage signal.

A drain electrode of the reset transistor 23 is connected to a pixel power supply having the power supply voltage VDD and a source electrode thereof is connected to the FD unit 26. The reset transistor 23 resets a potential of the FD unit 26 to a power supply voltage VDD when reset pulse RST is given to the gate electrode prior to the transfer of signal charges from the photodiode 21 to the FD unit 26.

A gate electrode of the amplifying transistor 24 is connected to the FD unit 26 and a drain electrode thereof is connected to the pixel power supply having the power supply voltage VDD. The amplifying transistor 24 outputs, as a reset level, the potential of the FD unit 26 after being reset by the reset transistor 23 and outputs, as a signal level, the potential of the FD unit 26 after the signal charges are transferred by the transfer transistor 22.

A drain electrode of the selecting transistor 25 is connected to a source electrode of the amplifying transistor 24 and a source electrode thereof is connected to the vertical signal line 111. The selecting transistor 25 sets the pixel in a selected state when a selection pulse SEL is given to a gate electrode thereof and outputs a signal, which is outputted from the amplifying transistor 24, to the vertical signal line ill. It is also possible to connect the selecting transistor 25 between the pixel power supply and the drain electrode of the amplifying transistor 24.

In this example, the present invention is applied to the CMOS image sensor including the unit pixel 20 of the four-transistor configuration including the transfer transistor 22, the reset transistor 23, the amplifying transistor 24, and the selecting transistor 25. However, the present invention is not limited to this application example.

Specifically, the present invention is also applicable to, for example, a CMOS image sensor including a unit pixel of a three-transistor configuration in which the selecting transistor 25 is removed and the amplifying transistor 24 is given the function of the selecting transistor 25 by making it possible to switch a voltage value of the power supply voltage VDD.

Correction Processing

Details of correction processing are explained. The correction processing is implemented for acquiring a luminance value of incident light of a saturated pixel (Aggressor) according to a wide dynamic ranging operation and correcting a blooming amount to a pixel suffering blooming (a correction pixel) from peripheral pixels of the pixel (i.e., a noise signal amount due to photo-charges leaking from the peripheral pixels into the correction pixel) making use of the fact that the blooming amount is proportional to sensitivity of the saturated pixel.

A correction amount in the correction processing is calculated by obtaining incident light luminance from a pixel value (a luminance value), which is obtained by the wide dynamic ranging operation, of the pixel to be saturated during an accumulation period (Aggressor). Blooming does not occur until the pixel is saturated. Therefore, a value calculated by subtracting a luminance value equivalent to a saturation level from the luminance value, i.e., a value exceeding the saturation level is quantitatively obtained and a blooming amount leaking into the correction pixel at a fixed rate of the value exceeding the saturation level is obtained by multiplying the value with a coefficient.

Since blooming occurs from the peripheral pixels, a sum of blooming amounts obtained from one or more peripheral pixels adjacent to the correction pixel is set as a correction value. Correction is performed by subtracting the blooming correction value from a luminance value of the pixel suffering the blooming (Victim).

This correction processing is executed as one of the various kinds of signal processing in the DSP circuit 40 as described above. Specific examples of correction processing executed by the DSP circuit 40 are explained below.

FIRST EXAMPLE

Figure 3:
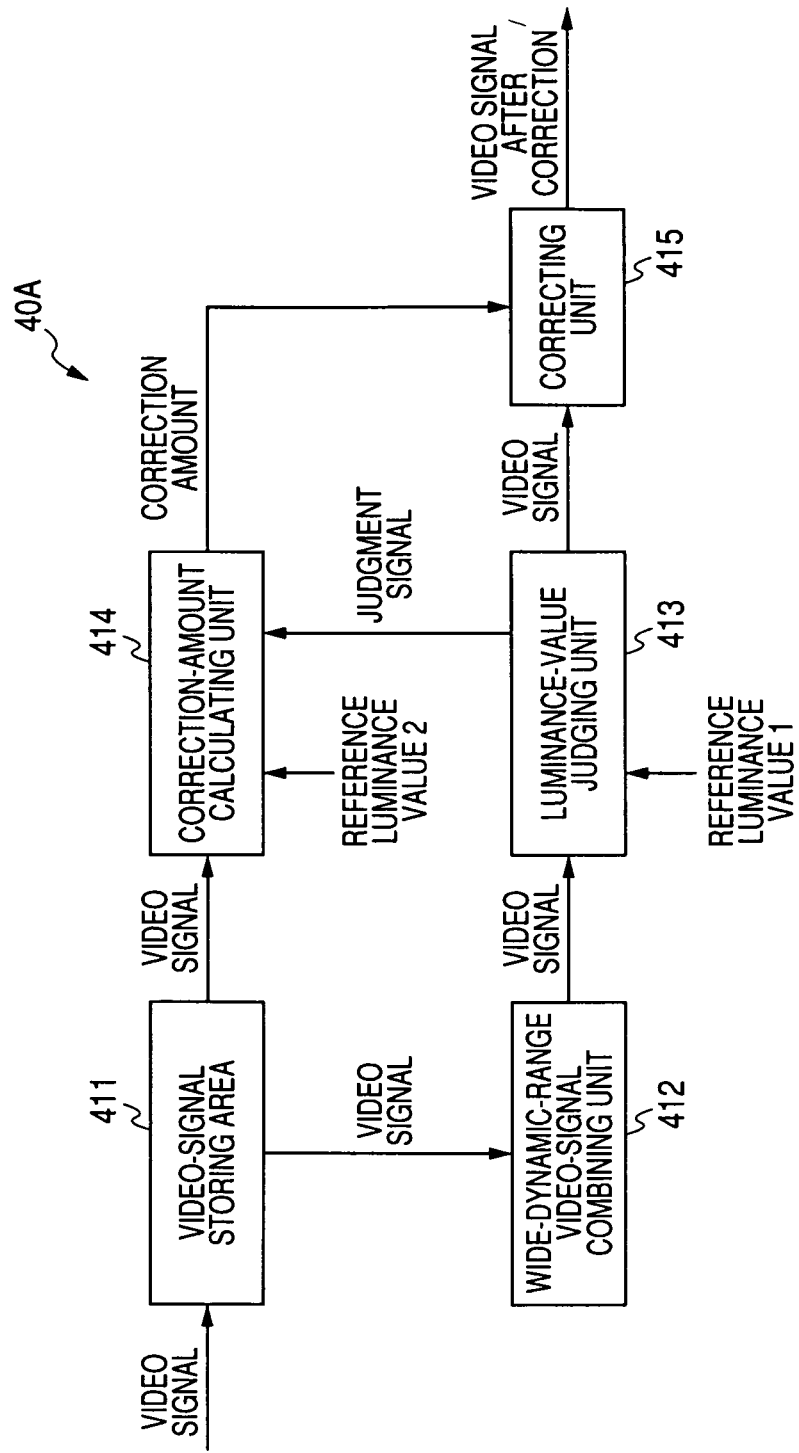
FIG. 3 is a functional block diagram showing a correction processing function of a DSP circuit according to a first example.

FIG. 3 is a functional block diagram showing an example of functions of correction processing by a DSP circuit 40A according to a first example.

As shown in FIG. 3, the DSP circuit 40A according to the first example includes a video-signal storing area 411, a wide-dynamic-range video-signal combining unit 412, a luminance-value judging unit 413, a correction-amount calculating unit 414, and a correcting unit 415.

It is assumed here that first and second video signals with different sensitivities are obtained from the respective pixels 20 in the pixel array unit 11 by a wide dynamic ranging operation realized by applying the wide dynamic range method 1 disclosed in Patent Document 1, the wide dynamic range method 2 disclosed in Non-Patent Document 1, or a wide dynamic range method proposed by the applicant in Japanese Patent Application No. 2006-280959, i.e., a method of expanding a dynamic range by partially reading out high-luminance pixels during an exposure period and adding up the high-luminance pixels (hereinafter referred to as wide dynamic range method 3).

In FIG. 3, the video-signal storing area 411 includes, for example, a frame memory and temporarily stores first and second video signals outputted from a pixel of interest. The wide-dynamic-range video-signal combining unit 412 obtains a wide dynamic range video signal by combining the first and second video signals, for example, adding up the first and second video signals.

The luminance-value judging unit 413 compares a luminance value of the wide dynamic range video signal with a reference luminance value 1 to thereby judge whether the pixel of interest is affected by blooming. The luminance-value judging unit 413 gives a signal of the judgment to the correction-amount calculating unit 414 and directly transmits the wide dynamic range video signal to the correcting unit 415.

When the luminance value of the wide dynamic range video signal is lower than the reference luminance value 1, the luminance-value judging unit 413 judges that the pixel of interest is affected by blooming. It is assumed that the reference luminance value 1 is an output value equivalent to lowest incident light luminance with which the pixel is saturated at least temporarily during an exposure period. Details of setting of the reference luminance value 1 are described later. When the luminance value of the video signal is lower than the reference luminance value 1, this means that the pixel is not saturated in the exposure period.

The correction-amount calculating unit 414 sets the pixel, about which the judgment signal is given from the luminance-value judging unit 413, as a pixel to be corrected (a correction pixel) and calculates a correction amount from luminance values of video signals of pixels, luminance values of which exceed a reference luminance value 2, among peripheral pixels of the pixel. Like the reference luminance value 1, the reference luminance value 2 is equivalent to an output value with which the pixel is saturated. A video signal of a pixel saturated at least temporarily in the exposure period is detected as an object of a correction amount calculation.

The correcting unit 415 corrects a blooming amount by applying the correction amount (a blooming correction value) calculated by the correction-amount calculating unit 414 to the luminance value of the wide dynamic range video signal inputted from the luminance-value judging unit 413, for example, subtracting the correction amount from the luminance value of the wide dynamic range video signal and outputs the wide dynamic range video signal as a video signal after correction.

Setting of the Reference Luminance Value 1

Figure 4:
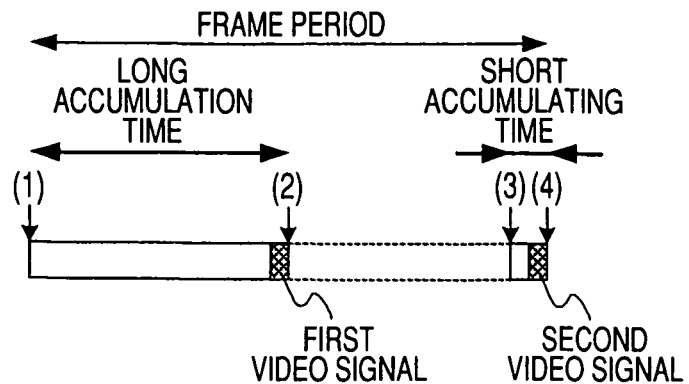
FIG. 4 is a diagram for explaining an example of setting of a reference luminance value 1.
Figure 5A:
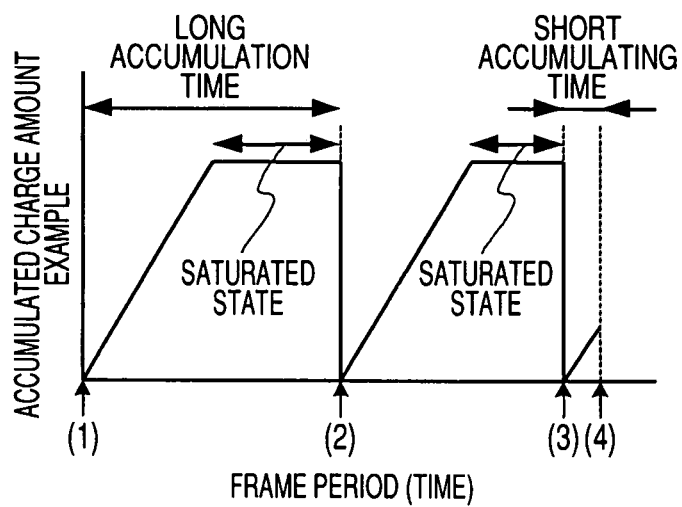
FIGS. 5A and 5B are diagrams for explaining the example of the setting of the reference luminance value 1.
Figure 5B:
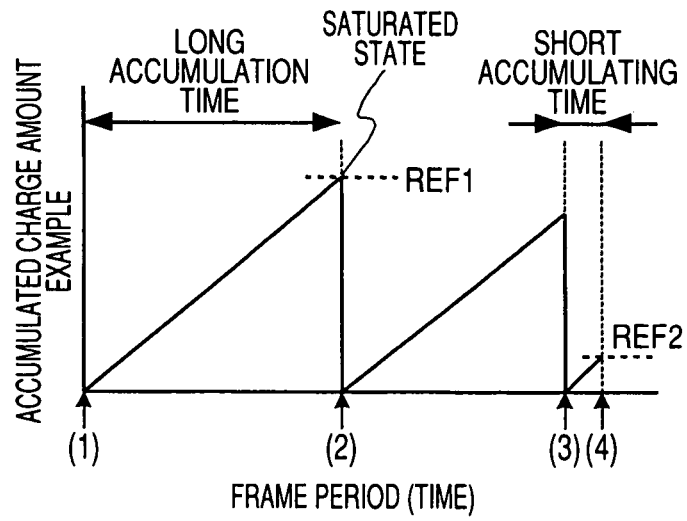

Setting of the reference luminance value 1 is more specifically explained. As shown in FIG. 4, when first and second video signals with different sensitivities are obtained in long accumulation time and short accumulation time, a pixel is temporarily saturated as shown in FIG. 5A depending on incident light luminance. In this case, lowest incident light luminance with which the pixel is saturated is shown in FIG. 5B. Output values REF1 and REF2 equivalent to the lowest incident light luminance are the reference luminance value 1.

When a luminance value of the reference luminance value 1 is compared with the first video signal, the output value REF1 is the reference luminance value 1. When a luminance value of the reference luminance value 1 is compared with the video signal 2, the output value REF2 is the reference luminance value 1. When the luminance values of the first and second video signals are lower than the reference luminance value 1, it is judged that the pixel is not saturated during an exposure period. However, it is preferable to set the reference luminance value 1 slightly lower than the output values REF1 and REF2 taking into account a margin.

Figure 6:
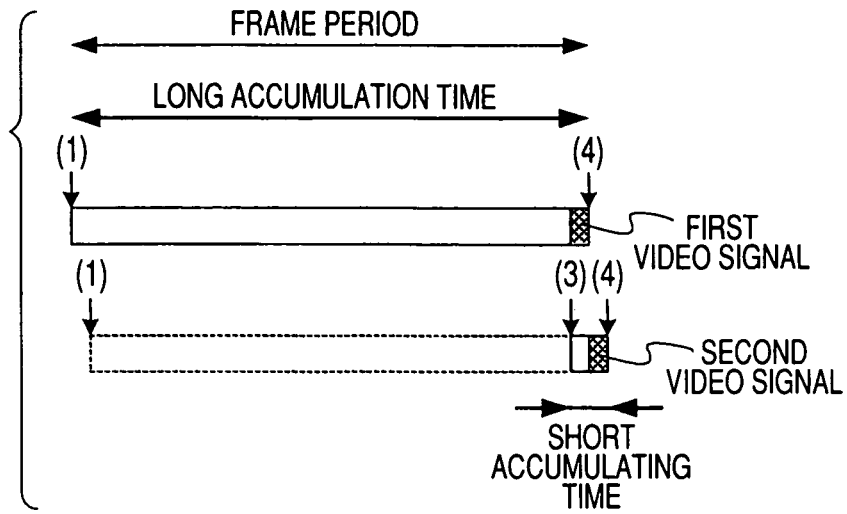
FIG. 6 is a diagram for explaining another example of the setting of the reference luminance value 1.
Figure 7A:
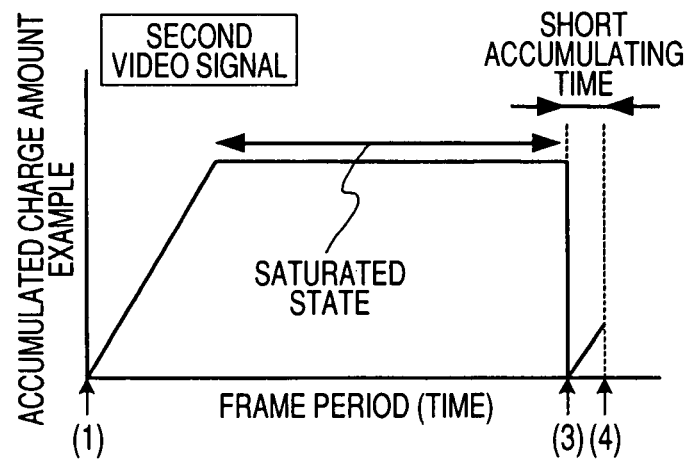
FIGS. 7A and 7B are diagrams for explaining another example of the setting of the reference luminance value 1.
Figure 7B:
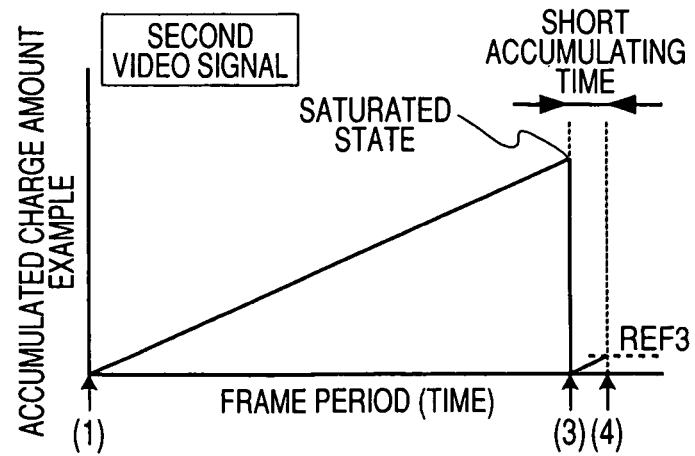

As shown in FIG. 6, when different accumulation times are applied to respective pixels or respective rows, for example, a pixel to which short accumulation time is applied may be saturated before the short accumulation time is started as shown in FIG. 7A. FIG. 7B shows a case of lowest incident light luminance with which the pixel is saturated. The output value REF3 is set as the reference luminance value 1.

SECOND EXAMPLE

Figure 8:
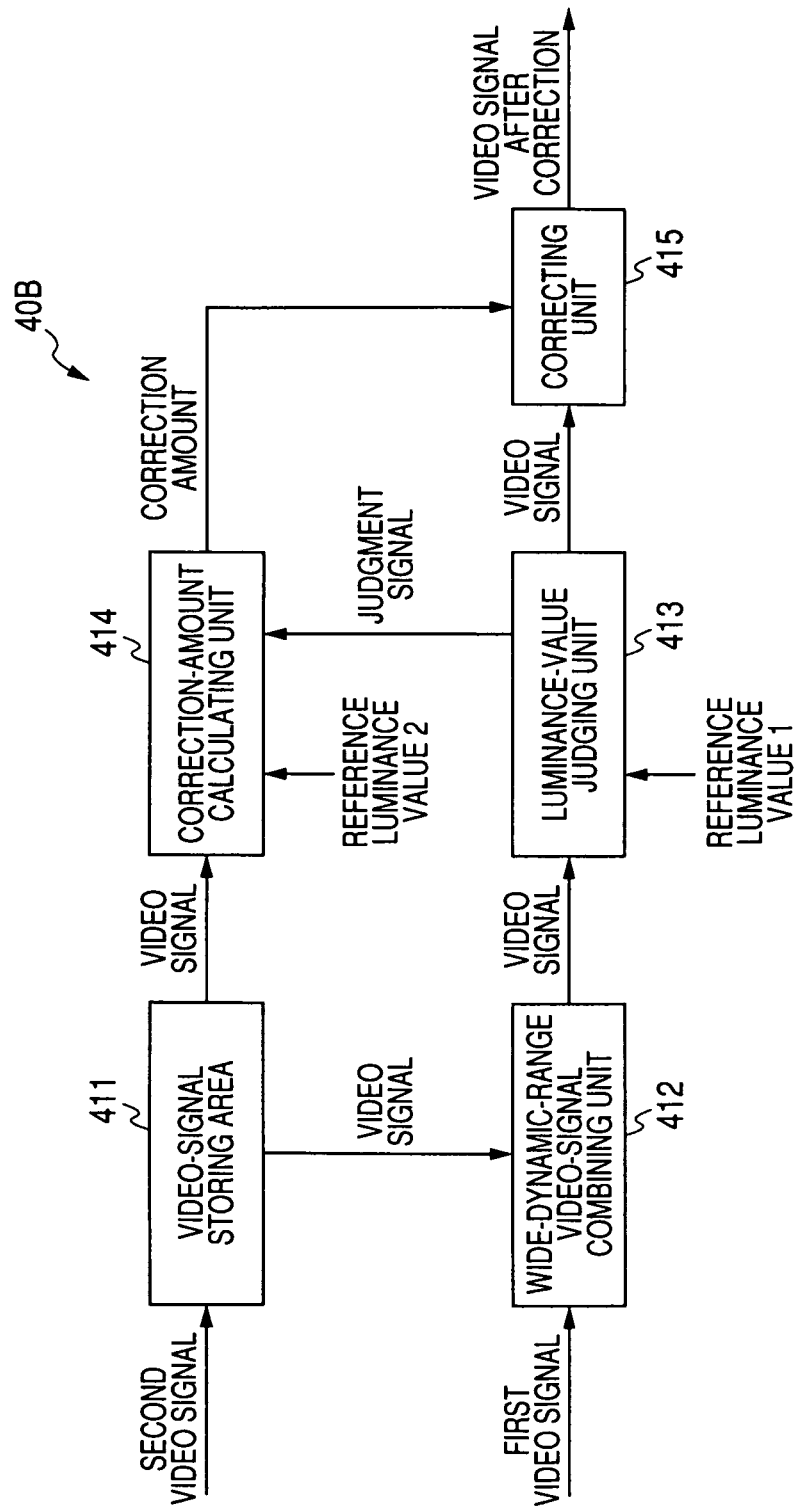
FIG. 8 is a functional block diagram showing a correction processing function of a DSP circuit according to a second example.

FIG. 8 is a functional block diagram showing an example of functions of correction processing by a DSP circuit 40B according to a second example. In the figure, components same as those shown in FIG. 3 are denoted by the same reference numerals.

The DSP circuit 40B according to the second example is explained on condition that, as in the wide dynamic range methods 1 and 2, a high-sensitivity image frame equivalent to a long exposure period and a low-sensitivity image frame equivalent to a short exposure period are alternately outputted from the chip 30.

One of the high-sensitivity image frame and the low-sensitivity image frame outputted from the chip 30 earlier is temporarily stored in the video-signal storing area 411 including a frame memory. In this example, a second video signal as a low-sensitivity image (an image in a short exposure period) is outputted from the chip 30 earlier and temporarily stored in the video-signal storing area 411.

When a first video signal as a high-sensitivity image (an image in a long exposure period) is read out from the chip 30, the wide-dynamic-range video-signal combining unit 412 obtains a wide dynamic range video signal by combining the first video signal and the second video signal temporarily stored in the video-signal storing area 411, for example, adding up the first video signal and the second video signal.

The luminance-value judging unit 413 judges whether a pixel is a pixel suffering blooming (Victim) by comparing a luminance value of the wide dynamic range video signal with the reference luminance value 1 every time the first video signal is read out sequentially from the chip 30. The luminance-value judging unit 413 gives a signal of the judgment to the correction-amount calculating unit 414 and directly transmits the wide dynamic range video signal to the correcting unit 415.

The correction-amount calculating unit 414 sets the pixel, about which the judgment signal is given from the luminance-value judging unit 413, as a pixel to be corrected (a correction pixel) and calculates a correction amount (a blooming correction value) from luminance values of pixels, luminance values of which exceed a reference luminance value 2, among peripheral pixels of the pixel. The correcting unit 415 corrects a blooming amount by subtracting the correction amount calculated by the correction-amount calculating unit 414 from the wide dynamic range video signal inputted from the luminance-value judging unit 413 and outputs the wide dynamic range video signal as a video signal after correction.

In the first example, the second video signal as the low-sensitivity image is read out earlier. However, when the first video signal as the high-sensitivity image is read out earlier, it is sufficient to store an image frame of the image in the frame memory, temporarily store pixel values of plural rows of the low-sensitivity image to be read out next in a storage medium, and use the pixel values to predict a blooming amount from pixel values of peripheral pixels.

When the first video signal and the second video signal are alternately outputted for each of pixels or each of rows rather than for each of frames, only video signals necessary for calculation have to be stored in the video-signal storing area 411. It is not always necessary to store all the frames.

THIRD EXAMPLE

Figure 9:
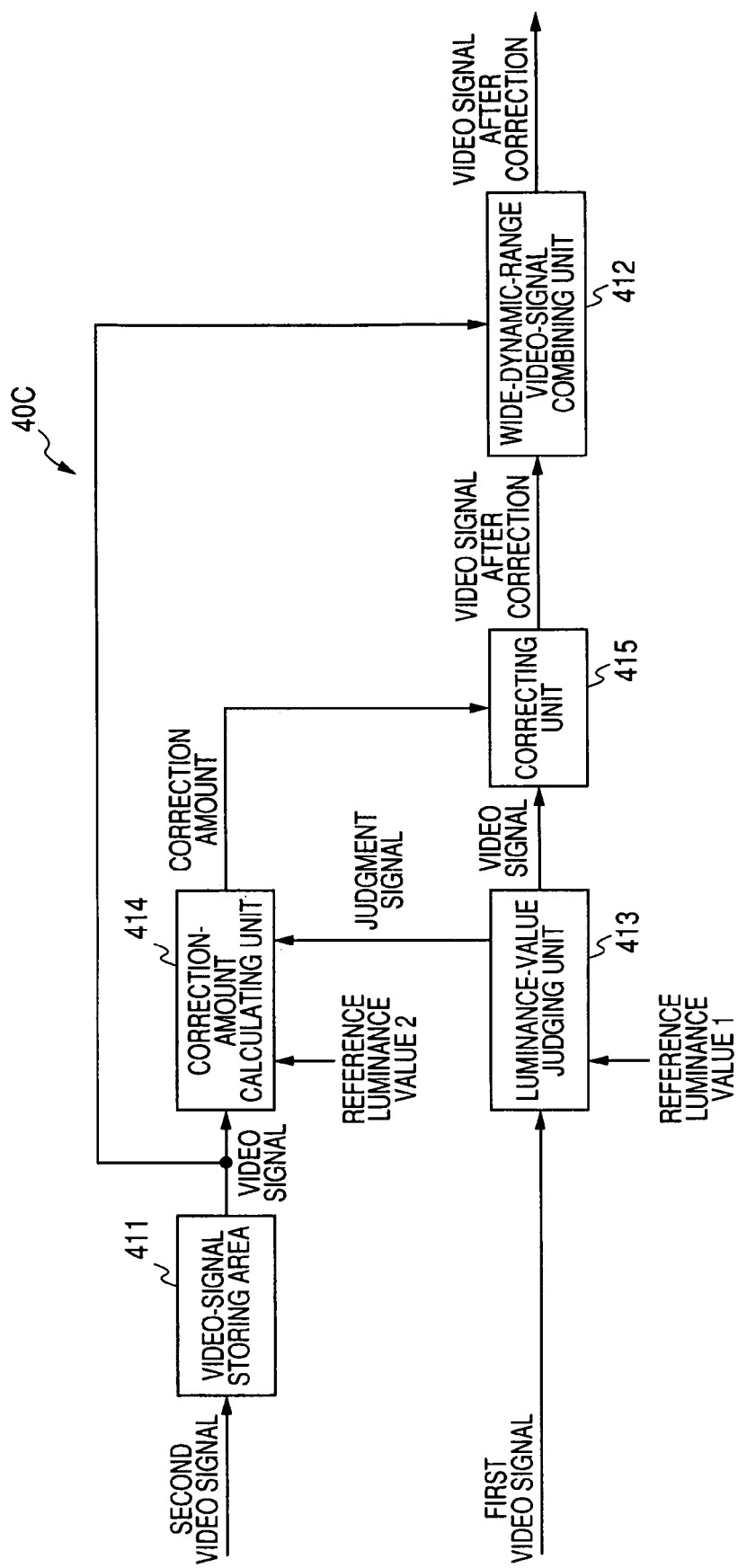
FIG. 9 is a functional block diagram showing a correction processing function of a DSP circuit according to a third example.

FIG. 9 is a functional block diagram showing an example of functions of correction processing by a DSP circuit 40C according to a third example. In the figure, components same as those shown in FIG. 8 are denoted by the same reference numerals.

As shown in FIG. 9, in the DSP circuit 40C according to the third example, the wide-dynamic-range video-signal combining unit 412 is arranged at a post-stage of the correcting unit 415. A wide dynamic range video signal is obtained by combining a first video signal corrected by the correcting unit 415 and a second video signal temporarily stored in the video-signal storing area 411, for example, adding up the first video signal and the second video signal.

Even when the processing for combining the wide dynamic range video signal is executed after correction of a blooming amount for the video signal is performed, it is possible to realize correction processing same as that in the second example.

As in the first to third examples described above, in the DSP circuit 40, a luminance value of incident light of the saturated pixel (Aggressor) is acquired by the wide dynamic ranging operation, a blooming amount is predicted from a luminance value of the second video signal of the saturated pixel making use of the fact that the blooming amount is proportional to sensitivity of the saturated pixel, and a correction amount is calculated from the blooming amount to correct a blooming amount of the pixel suffering the blooming (Victim). Consequently, it is possible to control nonlinearity (see FIG. 23) due to the blooming. Therefore, since a gradation of an image can be accurately represented, it is possible to improve an image quality. In a color image, the problem of color drift, i.e., generation of a color different from an actual color due to luminance can be solved.

Figure 10:
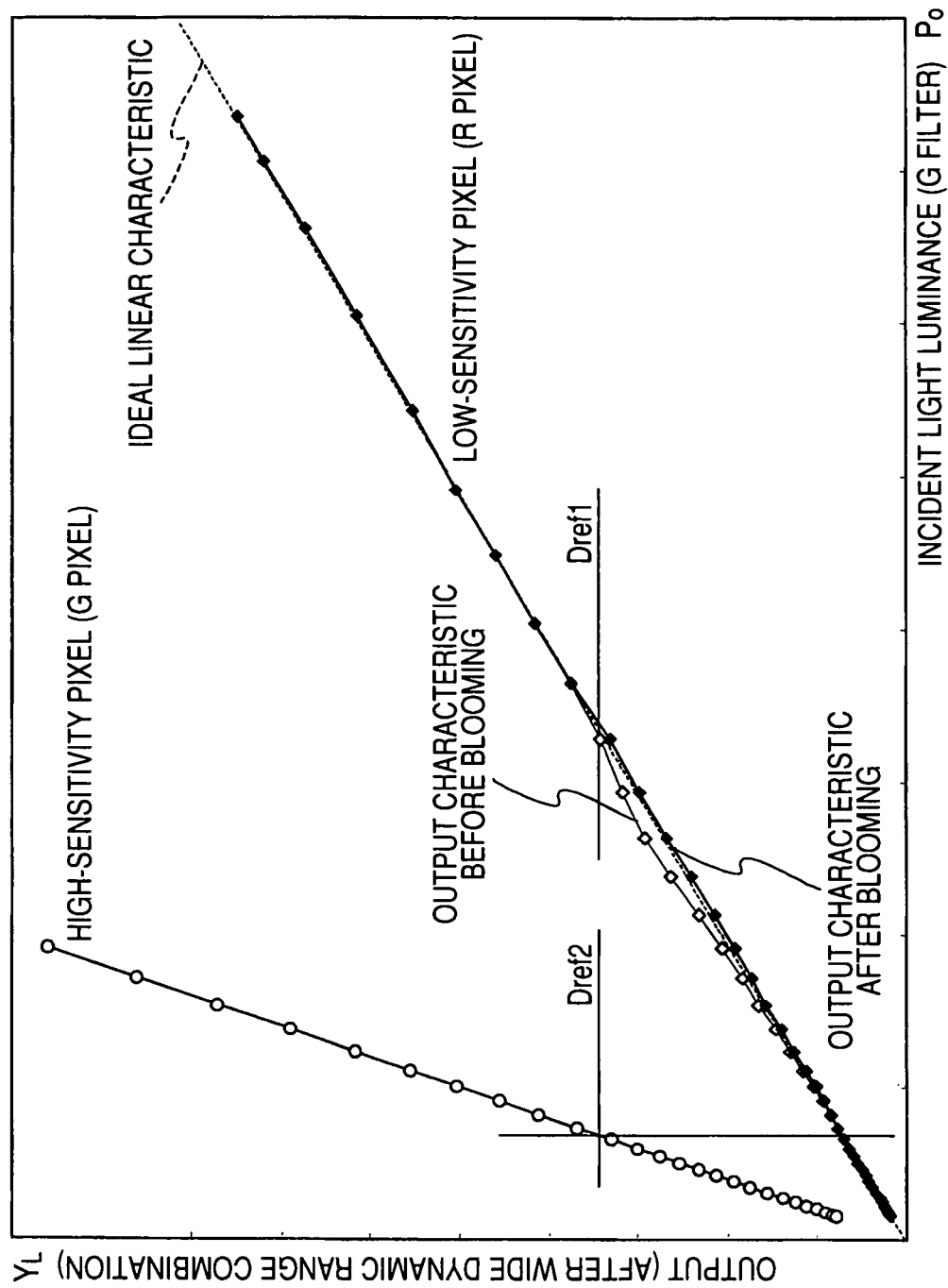
FIG. 10 is an input output characteristic chart showing an effect of correction processing obtained by an experiment.

An effect of the correction processing obtained by an experiment is shown in FIG. 10. Blooming occurs from a G (green) pixel with high sensitivity to an R (red) with low sensitivity with respect to incident light through a G filter that transmits a wavelength of G.

When a first video signal outputted from a low luminance area is saturated in the high-sensitivity G pixel, i.e., when a luminance value of the first video signal exceeds a reference luminance value 2 (Dref2), blooming occurs in the R pixel. Moreover, when a first video signal of the low-sensitivity R pixel is not saturated, i.e., when a luminance value of the first video signal is lower than a reference luminance value 1 (Dref1), an error due to a blooming amount spoils linearity.

The correction processing (signal processing) according to the first to third examples is applied to calculate a blooming correction amount from peripheral high-sensitivity G pixels and correct an output of the R pixel according to the blooming correction amount. Consequently, it is possible to correct the output to an output characteristic close to ideal linearity.

Modification

In the embodiment described above, the correction processing for correcting a blooming amount of the pixel suffering blooming (Victim) is executed by the DSP circuit 40. However, it is also possible to execute a series of processing for the correction processing with software under the control by a microcomputer.

Figure 11:
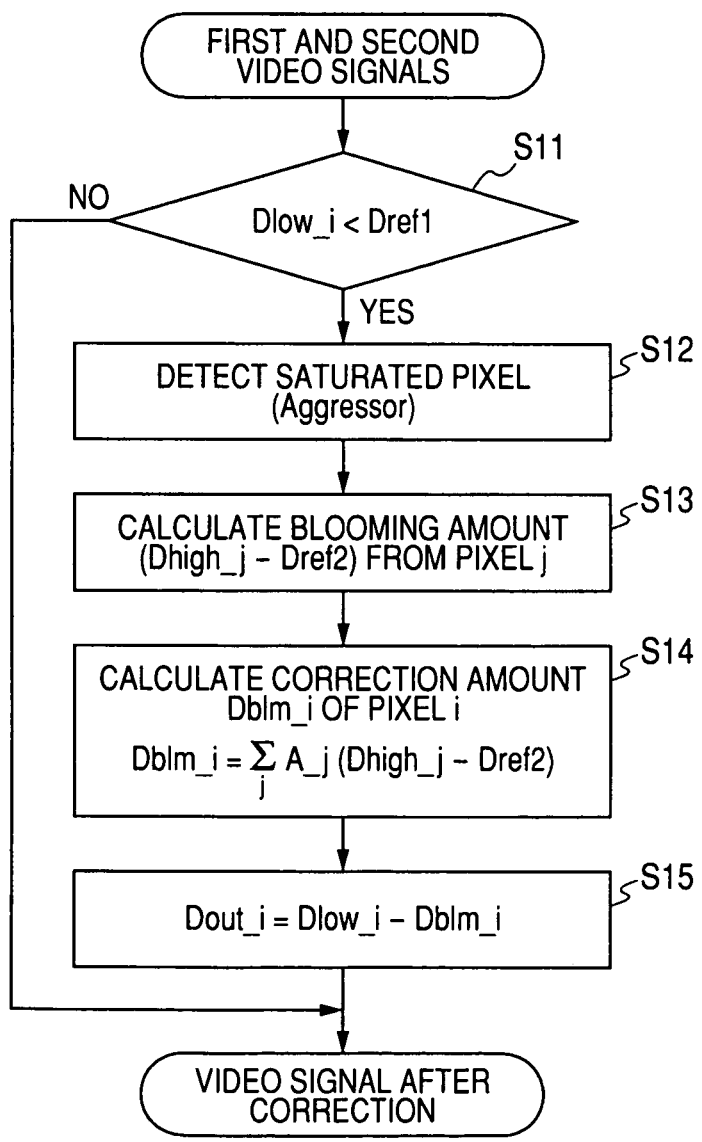
FIG. 11 is a flowchart showing an example of a processing procedure in executing correction processing with software.

A processing procedure in executing the correction processing with the software is explained with reference to a flowchart in FIG. 11 and diagrams for explaining the processing in FIGS. 12A to 12D. A series of processing procedure from acquisition of first and second video signals with different sensitivities obtained by applying the wide dynamic range method 1, 2, 3, or the like until output of a video signal after correction is outputted is explained.

A luminance value Dlow_i of a first video signal and a luminance value Dhigh_i of a second video signal of a pixel of interest i are acquired. Then, first, it is judged whether the luminance value Dlow_i of the first video signal is lower than a reference luminance value Dref1 that is a saturation level of a low-sensitivity pixel, whereby it is judged whether the pixel of interest i is a pixel suffering blooming (Victim) (step S11).

As shown in FIG. 12A, in the pixel suffering blooming (Victim)i, when the luminance value Dlow_i of the first video signal is lower than the reference luminance value Dref1 (Dlow_i<Dref1), the pixel is not saturated with the luminance value Dlow_i of the first video signal. It is judged that the pixel suffers blooming that occurs when peripheral pixels are saturated.

When it is judged in step S11 that the pixel of interest i is a pixel not suffering blooming, the correction processing is not executed. When it is judged that the pixel of interest i is the pixel suffering blooming (Victim), the pixel of interest i is set as a pixel to be corrected and a pixel (Aggressor) j to be saturated during an exposure period or during a charge accumulation period from the peripheral pixels of the correction pixel i is detected (step S12).

As shown in FIG. 12B, when a luminance value Dhigh_j of the second video signal of the peripheral pixels j exceeds a reference luminance value Dref2 that is a saturation level of a high-sensitivity pixel (Dhigh_j>Dref2), the pixel is saturated with a luminance value Dlow_j of the second video signal. Therefore, blooming occurs in the peripheral pixels j adjacent to the correction pixel i.

The pixel value Dref2 equivalent to luminance, with which the pixels j are saturated, is subtracted from the pixel value Dhigh_j of the peripheral pixels (Aggressor) j that causes the blooming (Dhigh_j−Dref2). A value obtained by multiplying a result of the subtraction with a correction coefficient A_j corresponding to a rate of leaking-in photo-charges, which is blooming, is set as a blooming amount from the pixels j (step S13).

In other words, in view of the fact that the blooming amount is proportional to sensitivity of the saturated pixel, a value A_j (Dhigh_j −Dref2) obtained by multiplying an excess of the pixel value Dhigh_j of the pixels j over the reference luminance value Dref2 with the correction coefficient A_j is predicted as blooming amounts from the pixels j.

As shown in FIG. 12C, a sum of the blooming amounts A_j (Dhigh_j −Dref2) from the peripheral pixels j is a blooming amount included in the correction pixel i. Therefore, the sum is obtained as a correction amount (a blooming correction amount) Dblm_i of the correction pixel i (step S14).

As shown in FIG. 12D, the blooming correction amount Dblm_i obtained in step S14 is subtracted from the luminance value Dlow_i of the pixel suffering blooming (Victim)i, whereby correction with respect to the blooming is performed to output the first video signal as a first video signal after correction Dout_i.

As described above, even if the correction processing for correcting the blooming amount of the pixel suffering blooming (Victim) is executed by the software under the control by the microcomputer, it is possible to control nonlinearity due to blooming as in the case in which the correction processing is executed by the DSP circuit 40. Therefore, since a gradation of an image can be accurately represented, it is possible to improve an image quality. In a color image, the problem of color drift, i.e., generation of a color different from an actual color due to luminance can be solved.

In the embodiment and the modification of the embodiment, it is possible to improve correction accuracy by predicting a blooming amount using a larger number of pixels as peripheral pixels of a pixel of interest used for predicting a blooming amount of a pixel suffering blooming (a correction pixel). However, if at least one pixel such as adjacent one pixel, two pixels on the left and right, two pixels above and below, four pixels above and below and on the left and right, or eight pixels above and below, on the left and right, and in oblique directions are presented as peripheral pixels, it is possible to obtain the effect of correction.

When a blooming amount is predicted, a value exceeding the saturation level is multiplied with the correction coefficient A_j corresponding to a rate of leaking-in photo-charges. It is possible to improve correction accuracy by applying different coefficient values as the correction coefficient A_j according to a positional relation of the peripheral pixels with the correction pixel, i.e., directions in which the peripheral pixels are arranged and physical distances to the correction pixel or a difference in a pixel characteristic of a color filer or the like. This is because blooming amounts are different in pixels adjacent to the correction pixel on the left and right and above and below and pixels obliquely adjacent to the correction pixel and blooming amounts are different because of differences in pixel characteristics.

Second Embodiment

FIG. 13 is a system diagram showing a configuration example of a solid-stage imaging element, for example, a CMOS image sensor according to a second embodiment of the present invention. In the figure, components same as those shown in FIG. 1 are denoted by the same reference numerals.

In a CMOS image sensor 10B according to this embodiment, a correcting function for correcting a blooming amount of a pixel suffering blooming (Victim) is given to the column circuit 13. Otherwise, the CMOS image sensor 10B is the same as the CMOS image sensor 19A according to the first embodiment. Therefore, in the following explanation, the structure and operations of the column circuit 13 are mainly explained. Explanation about the other components is omitted to avoid redundancy.

The column circuit 13 includes the set of unit column circuits 130 including, for example, the signal processing circuits 131 and correction processing circuits 132 arranged in the respective pixel columns of the pixel array of the pixel array unit 11, i.e., in a one to one correspondence relation with the pixel columns. The column circuit 13 applies predetermined signal processing to signals outputted from the respective pixels 20 in the readout row, which is selected by the vertical scanning by the vertical scanning circuit 12, through the vertical signal lines 111 and temporarily holds the pixel signals after the signal processing.

In the unit column circuit 130, the signal processing circuits 131 apply, for example, to pixel signals outputted from the respective pixels 20 in a selected row through the vertical signal lines 111, various kinds of signal processing such as noise reduction processing for reducing, with CDS processing, reset noise and fixed pattern noise particular to pixels such as threshold fluctuation of the amplifying transistor 24 (see FIG. 2), signal combination processing for wide dynamic ranging, and AD conversion processing for converting an analog signal into a digital signal.

Correction Processing Circuit

The correction processing circuit 132 performs correction processing for correcting a blooming amount of a pixel suffering blooming (Victim). Details of the correction processing circuit 132 are explained below with reference to specific examples.

In the respective examples explained below, when the wide dynamic range method 1 or 3 is applied, the CMOS image sensor 10B holds an image frame read out earlier in a pixel using a stray diffusion capacitor of the pixel or by adding an analog memory to the pixel and sequentially outputs signals from high-sensitivity pixels and low-sensitivity pixels in pixel units or row units. Alternatively, when the wide dynamic range method 2 is applied, high-sensitivity pixels and low-sensitivity pixels are mixed in a pixel array and, in reading out pixel values, the CMOS image sensor 10B alternately outputs the pixel values in pixel units or row units.

FIRST EXAMPLE

Figure 14:
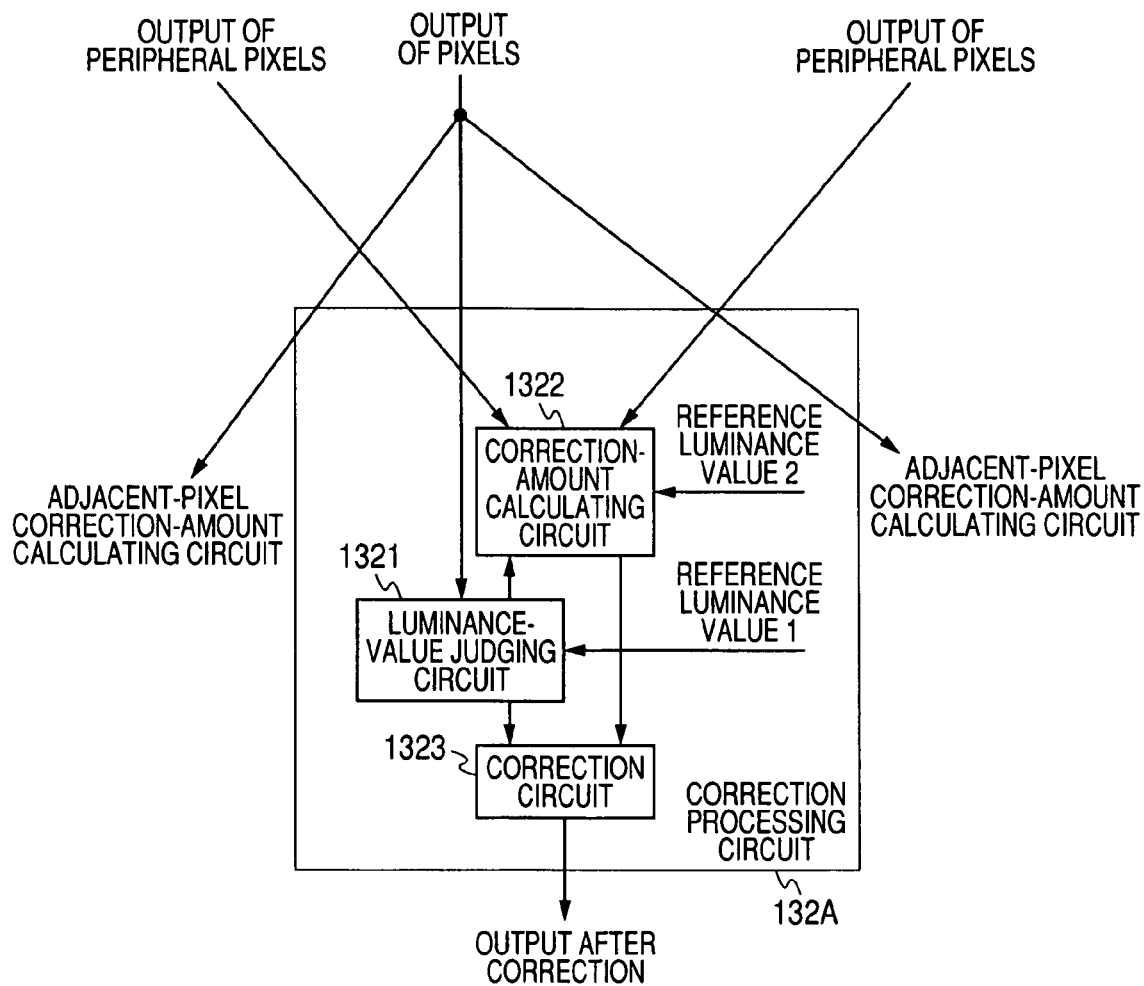
FIG. 14 is a block diagram showing a configuration of a correction processing circuit according to the first example.

FIG. 14 is a block diagram showing a configuration example of a correction processing circuit 132A according to a first example.

As shown in FIG. 14, the correction processing circuit 132A according to the first example includes a luminance-value judging circuit 1321, a correction-amount calculating circuit 1322, and a correcting circuit 1323.

The luminance-value judging circuit 1321 has a function same as that of the luminance-value judging unit 413 according to the first embodiment. The luminance-value judging circuit 1321 compares a luminance value of a video signal subjected to signal combination processing for wide dynamic ranging by the signal processing circuit 131 (a wide dynamic range video signal) with a reference luminance value 1 to thereby judge whether a pixel of interest is affected by blooming. The luminance-value judging circuit 1321 gives a signal of the judgment to the correction-amount calculating circuit 1322 and directly transmits the video signal to the correcting circuit 1323.

When the luminance value is lower than the reference luminance value 1, the luminance-value judging circuit 1321 judges that the pixel of interest is subjected to blooming. It is assumed that the reference luminance value 1 is an output value equivalent to lowest incident light luminance with which the pixel is saturated at least temporarily during an exposure period. When the luminance value of the video signal is lower than the reference luminance value 1, this means that the pixel is not saturated in the exposure period. Setting of the reference luminance value 1 is the same as that in the first embodiment.

The correction-amount calculating circuit 1322 has a function same as that of the correction-amount calculating unit 414 according to the first embodiment. The correction-amount calculating circuit 1322 sets the pixel, about which the judgment signal is given from the luminance-value judging circuit 1321, as a pixel to be corrected (a correction pixel) and calculates a correction amount from luminance values of video signals of pixels, luminance values of which exceed a reference luminance value 2, among peripheral pixels of the pixel.

Figure 15:
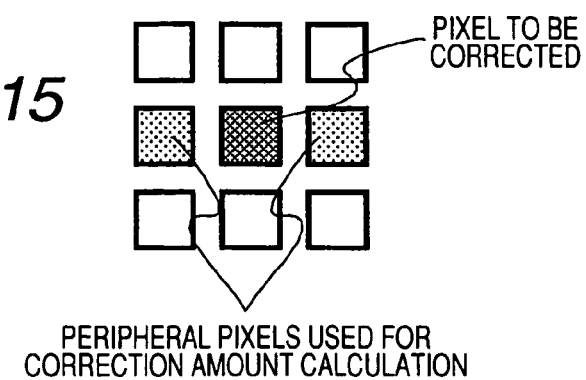
FIG. 15 is a diagram showing a relation between a pixel to be corrected and peripheral pixels of the pixel.

The correction-amount calculating circuit 1322 sets, for example, as shown in FIG. 15, two pixels on the left and right of the pixel to be corrected (a pixel of interest) as peripheral pixels used for a correction amount calculation. It is assumed that, like the reference luminance value 1, the reference luminance value 2 is an output value equivalent to an output value with which the pixel is saturated. A video signal of a pixel saturated at least temporarily in the exposure period is detected as an object of a correction amount calculation.

The correcting circuit 1323 has a function same as that of the correcting unit 415 in the first embodiment. The correcting circuit 1323 corrects a blooming amount by applying the correction amount (a blooming correction value) calculated by the correction-amount calculating circuit 1322 to the luminance value of the wide dynamic range video signal inputted from the luminance-value judging circuit 1321, for example, subtracting the correction amount from the luminance value of the wide dynamic range video signal and outputs the wide dynamic range video signal as a video signal after correction.

SECOND EXAMPLE

Figure 16:
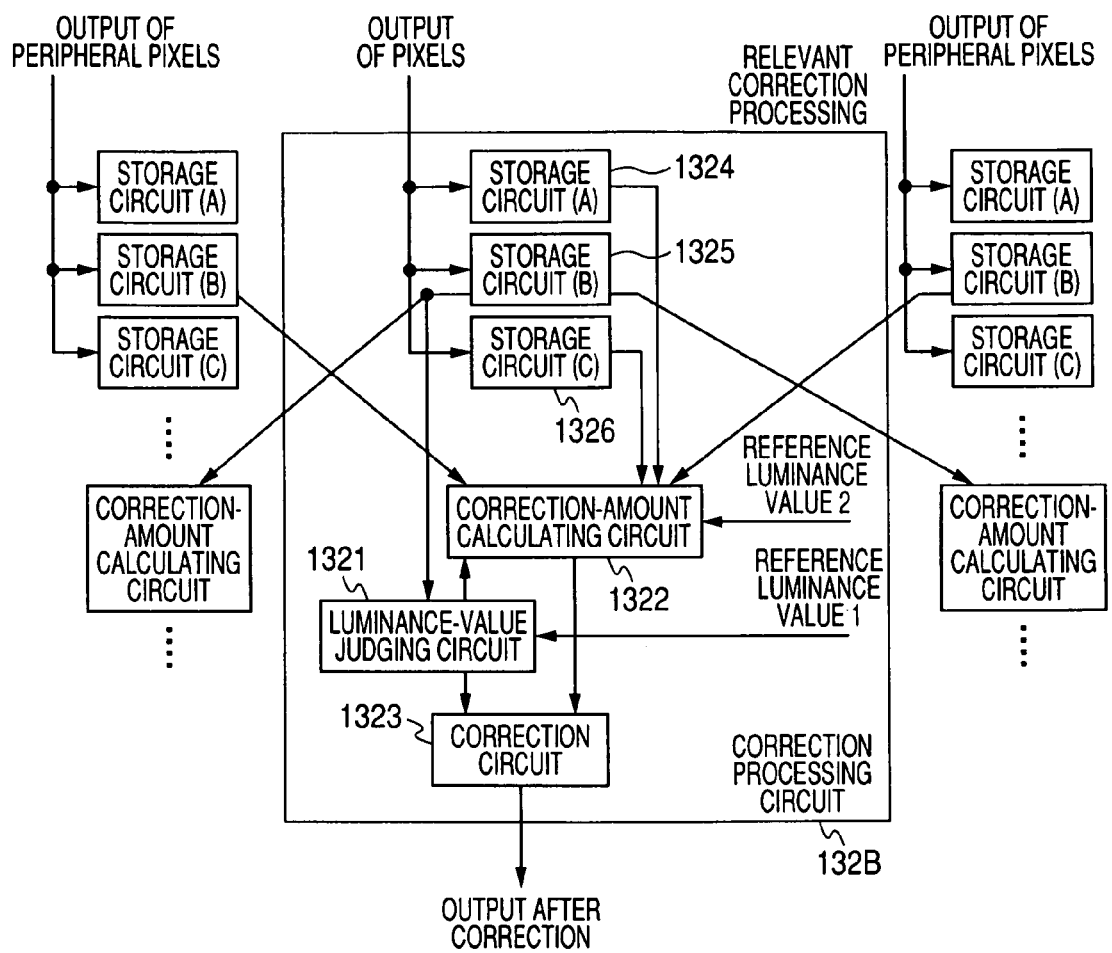
FIG. 16 is a block diagram showing a configuration of a correction processing circuit according to the second example.

FIG. 16 is a block diagram showing a configuration example of a correction processing circuit 132B according to a second example. In the figure, components same as those shown in FIG. 14 are denoted by the same reference numerals.

Figure 17:
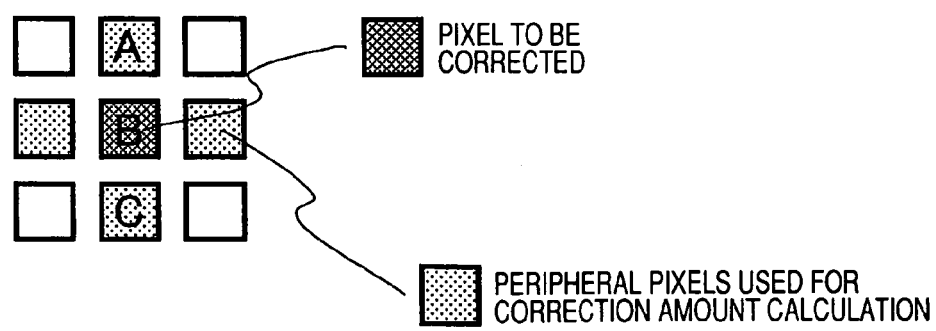
FIG. 17 is a diagram showing a relation between a pixel to be corrected and peripheral pixels of the pixel.

As shown in FIG. 17, the correction processing circuit 132B according to the second example sets four pixels above and below and on the left and right of a pixel to be corrected as peripheral pixels used for a correction amount calculation. Therefore, the correction processing circuit 132B includes, in addition to the luminance-value judging circuit 1321, the correction-amount calculating circuit 1322, and the correcting circuit 1323, three storing circuits (A) 1324, (B) 1325, and (C) 1326.

A signal of a pixel A above a pixel B to be corrected is stored in the storing circuit (A) 1324. A signal of the pixel B to be corrected is stored in the storing circuit (B) 1325. A signal of a pixel C below the pixel B to be corrected is stored in the storing circuit (C) 1326.

The luminance-value judging circuit 1321 compares a luminance value of a wide dynamic range video signal for the pixel B subjected to signal combination processing for wide dynamic ranging by the signal processing circuit 131 with a reference luminance value 1 to thereby judge whether the pixel B is affected by blooming. The luminance-value judging circuit 1321 gives a signal of the judgment to the correction-amount calculating circuit 1322 and directly transmits the wide dynamic range video signal to the correcting circuit 1323.

When a judgment signal is given from the luminance-value judging circuit 1321 concerning the pixel B, the correction-amount calculating circuit 1322 sets the pixel B as a pixel to be corrected and compares respective luminance values of signals of pixels on the left and right of the pixel B, the signal of the pixel A stored in the storing circuit (A) 1324, and the signal of the pixel C stored in the storing circuit (C) 1326 with a luminance value 2, and calculates a correction amount using signals of pixels, luminance values of which exceed the reference luminance value 2.

The correcting circuit 1323 corrects a blooming amount by subtracting the correction amount calculated by the correction-amount calculating circuit 1322 from the wide dynamic range video signal of the pixel B inputted from the luminance-value judging circuit 1321 and outputs the wide dynamic range video signal as a video signal after correction.

As in the first and second example described above, in the column circuit 13, a luminance value of incident light of the saturated pixel (Aggressor) is acquired by the wide dynamic ranging operation, a blooming amount is predicted from a luminance value of the second video signal of the saturated pixel making use of the fact that the blooming amount is proportional to sensitivity of the saturated pixel, and a correction amount is calculated from the blooming amount to correct a blooming amount of the pixel suffering the blooming. Consequently, it is possible to control nonlinearity due to the blooming. Therefore, since a gradation of an image can be accurately represented, it is possible to improve an image quality. In a color image, the problem of color drift, i.e., generation of a color different from an actual color due to luminance can be solved.

The peripheral pixels of the correction pixel used for predicting a blooming amount of the pixel suffering blooming (the correction pixel) are two pixels on the left and right in the first example and are four pixels on the left and right and above and below in the second example. However, the peripheral pixels are not limited to these pixels. If at least one pixel such as adjacent one pixel or eight pixels above and below, on the left and right, and in oblique directions is present as a peripheral pixel, it is possible to obtain the effect of correction. However, it is possible to improve correction accuracy by predicting a blooming amount using a larger number of pixels.

As in the first embodiment, when a blooming amount is predicted, a value exceeding the saturation level is multiplied with the correction coefficient corresponding to a rate of leaking-in photo-charges. It is possible to improve correction accuracy by applying different coefficient values as the correction coefficient according to a positional relation of the peripheral pixels with the correction pixel, i.e., directions in which the peripheral pixels are arranged and physical distances to the correction pixel or a difference in a pixel characteristic of a color filer or the like.

Modification

In the embodiments described above, a correction amount is calculated from luminance values of first and second video signals imaged at two sensitivities, i.e., high sensitivity and low sensitivity. However, the present invention is not limited to this. It is also possible that a first video signal imaged at a first sensitivity and plural second, third, and Nth video signals imaged at plural second sensitivities different from one another are obtained and a correction amount is calculated for each of the first, second, . . . , and Nth video signals from a luminance value of one or plural video signals with lower sensitivity.

In the example explained in the embodiments, the present invention is applied to the CMOS image sensor in which unit pixels for detecting a signal charge corresponding to a light amount of visible light as a physical quantity are arranged in a matrix shape. However, the present invention is not limited to the application to the CMOS image sensor. The present invention is applicable to solid-state imaging devices in general that adopt methods of expanding a dynamic range such as the wide dynamic range methods 1 to 3.

The present invention is not limited to the application to the solid-state imaging device that detects a distribution of an incident light amount of visible light and images the distribution as an image. The present invention is applicable to solid-stage imaging devices (physical quantity distribution detecting devices) in general such as a solid-state imaging device that images a distribution of an incidence amount of an infrared ray, an X ray, particles, or the like as an image and a fingerprint detection sensor that detects, in a broader sense, a distribution of other physical quantities such as a pressure and a capacitance and images the distribution as an image.

Moreover, the present invention is applicable not only to a solid-state imaging device that scans respective unit pixels in a pixel array unit in row units and reads out pixel signals from the respective unit pixels but also to a solid-state imaging device of an X-Y address type that selects an arbitrary pixel in pixel units and reads out a signal from the selected pixel in pixel units.

The solid-state imaging device may be formed as one chip or may be a module-like form having an imaging function formed by collectively packaging an imaging unit and a signal processing unit or an optical system.

The present invention is not limited to the application to the solid-state imaging device and is also applicable to an imaging apparatus. The imaging apparatus refers to a camera system such as a digital still camera or a video camera or an electronic apparatus having an imaging function such as a cellular phone. The module-like form mounted on the electronic apparatus, i.e., a camera module may be an imaging apparatus.

Imaging Apparatus

Figure 18:
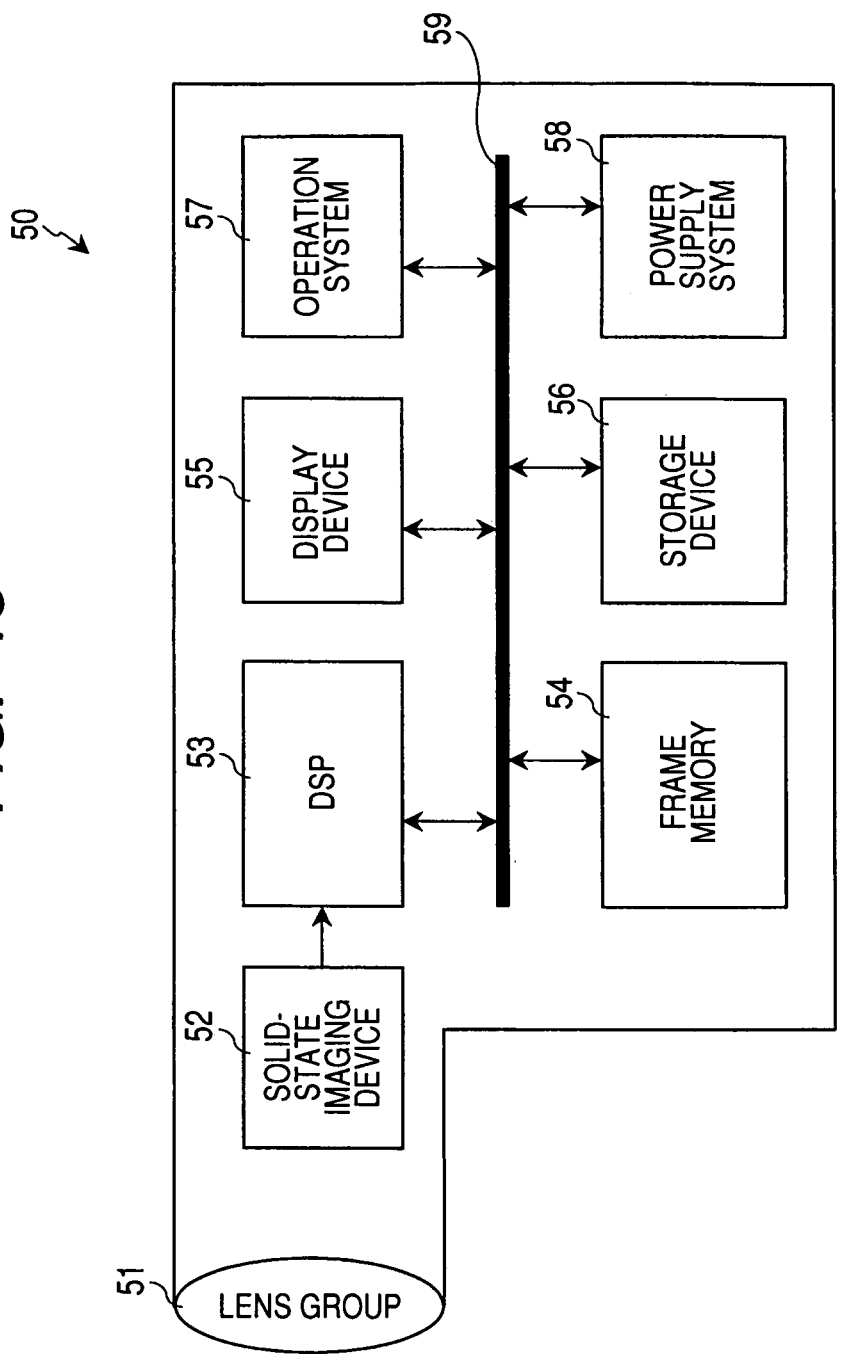
FIG. 18 is a block diagram showing an example of the structure of an imaging apparatus according to an embodiment of the present invention.
Figure 19A:
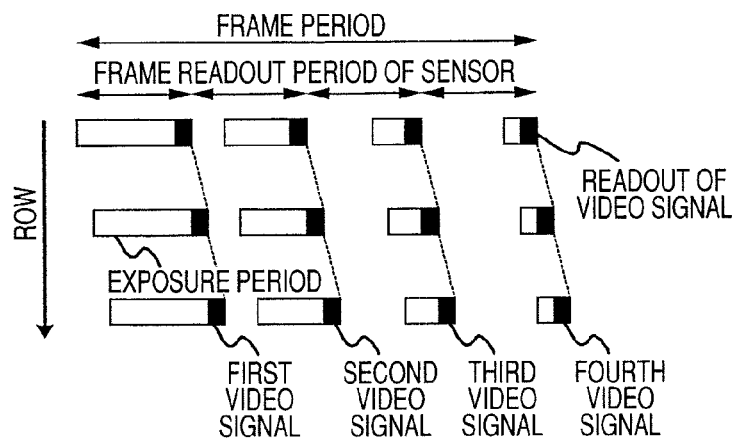
FIGS. 19A and 19B are diagrams for explaining a wide dynamic range method 1.
Figure 19B:
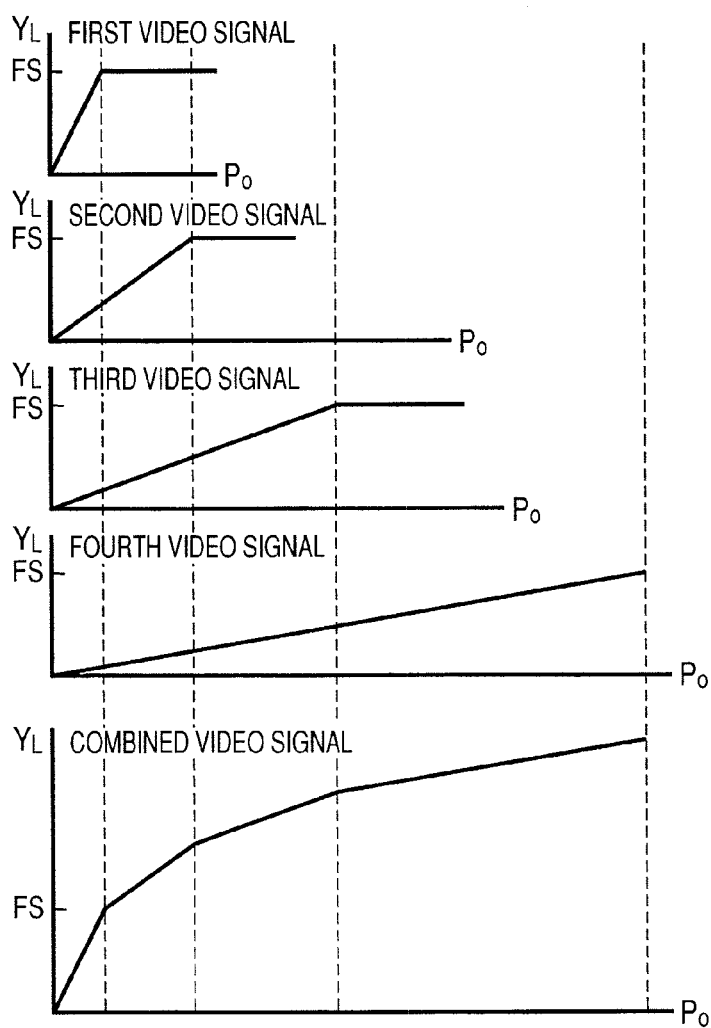
Figure 20A:
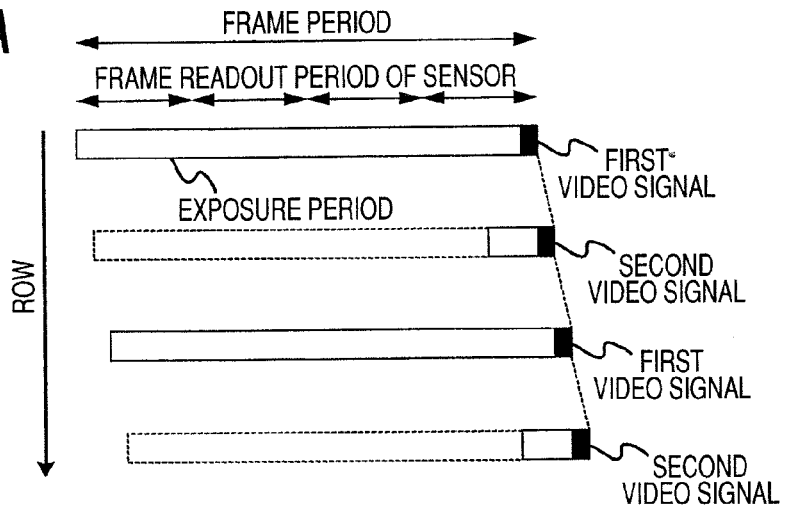
FIGS. 20A and 20B are diagrams for explaining a wide dynamic range method 2.
Figure 20B:
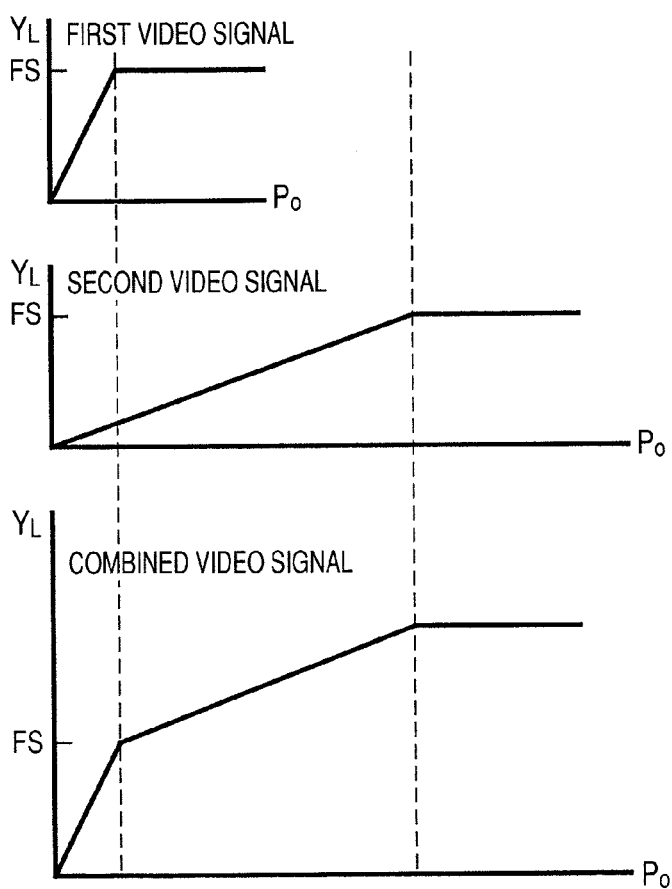
Figure 21:
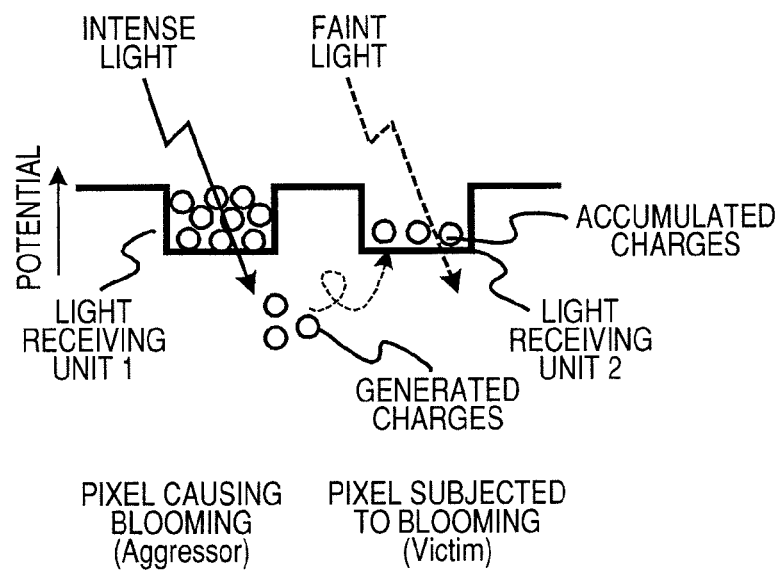
FIG. 21 is a diagram showing a state of blooming occurrence.
Figure 22A:
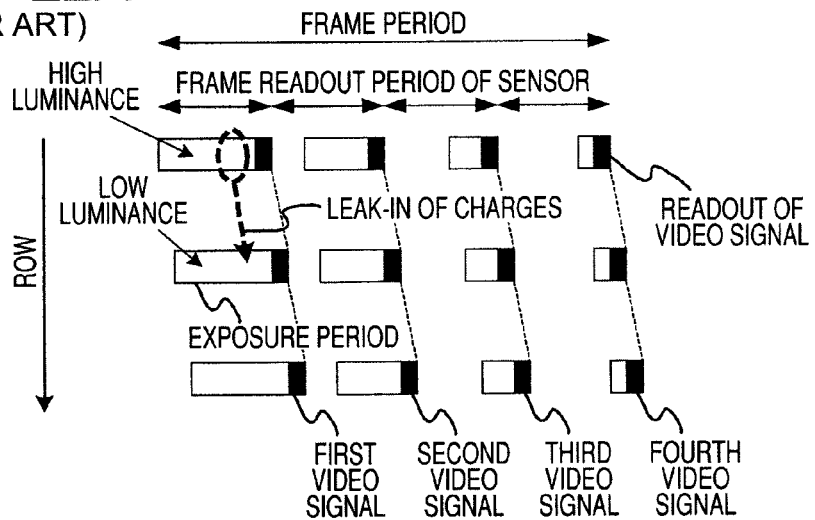
FIGS. 22A and 22B are diagrams showing examples of timing of occurrence of blooming.
Figure 22B:
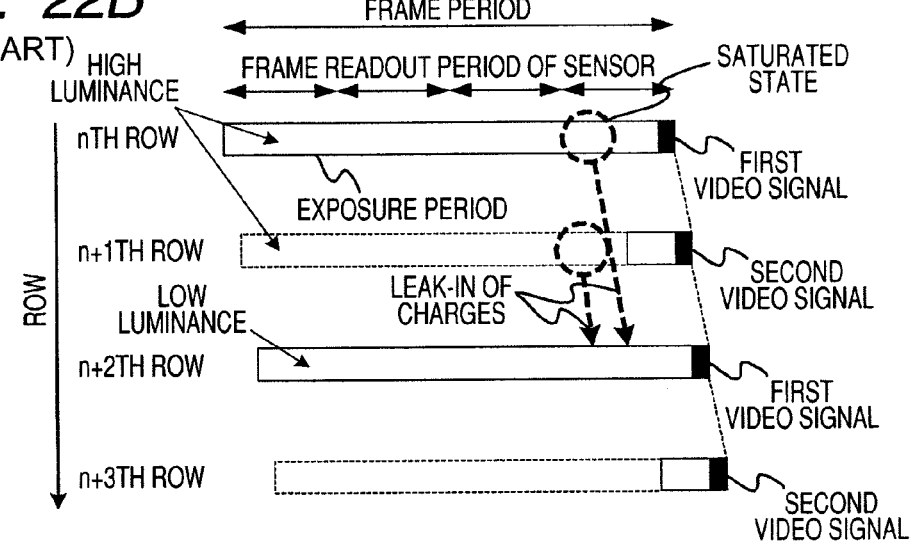

FIG. 18 is a block diagram showing an example of the structure of an imaging apparatus according to an embodiment of the present invention. As shown in FIG. 18, an imaging apparatus 50 according to the embodiment of the invention includes an optical system including a lens group 51, a solid-state imaging device 52, a DSP circuit 53 as a camera-signal processing circuit, a frame memory 54, a display device 55, a recording device 56, an operation system 57, and a power supply system 58. The DSP circuit 53, the frame memory 54, the display device 55, the recording device 56, the operation system 57, and the power supply system 58 are connected to one another via a bus line 59.

The lens group 51 captures incident light (image light) from a subject and focuses the incident light on an imaging surface of the solid-state imaging device 52. The solid-state imaging device 52 converts a light amount of the incident light, which is focused on the imaging surface by the lens group 51, into an electric signal in pixel units and outputs the electric signal as a pixel signal. As the solid-state imaging device 52, the CMOS image sensors 10A and 10B according to the above-described first and second embodiments are used.

The display device 55 includes a panel-type display device such as a liquid crystal display device or an organic EL (electro luminescence) display device. The display device 55 displays a moving image or a still image imaged by the solid-state imaging device 52. The recording device 56 records the moving image or the still image imaged by the solid-state imaging device 52 in a recording medium such as a video tape or a DVD (Digital Versatile Disk).

The operation system 57 issues, under the operation by a user, operation commands for various functions of the imaging apparatus. The power supply system 58 appropriately supplies various power supplies serving as operation power supplies for the DSP circuit 53, the frame memory 54, the display device 55, the recording device 56, and the operation system 57 to these supply objects.

As described above, in the imaging apparatuses such as a video camera and a digital still camera and a camera module for mobile apparatuses such as a cellular phone, the CMOS image sensors 10A and 10B according to the above-described first and second embodiments are used as the solid-state imaging device 52 of the imaging apparatuses. Consequently, in the CMOS image sensors 10A and 10B, it is possible to accurately represent a gradation of an image by correcting a blooming amount of a pixel suffering blooming and controlling nonlinearity due to the blooming. Therefore, it is possible to realize an imaging apparatus having a high image quality.

It should be understood by those skilled in the art that various modifications, combinations, sub-combinations, and

What I claim is:

1. A solid-state imaging device comprising:
    a pixel array of unit pixels including photoelectric conversion elements for converting light signals into signal charges; and
    a signal processing circuit that obtains a first video signal and a second video signal for each of a plurality of the unit pixels and performs processing for combining the first and second video signals, the first and second video signals having different maximum sensitivity levels, wherein
        a judging unit determines whether a particular unit pixel is saturated during an exposure period;
        a calculating unit calculates at least one correction amount on the basis of a luminance value for a unit pixel found to be saturated; and
        correcting unit for applying a correction amount calculated by the calculating unit to a video signal of a unit pixel immediately adjacent to the unit pixel found to be saturated to thereby correct a noise signal amount due to photo-charges leaking from the saturated unit pixel, and wherein the correction amount calculated by the calculating unit is based exclusively on a correction derived from one or more immediately adjacent unit pixels and only signal information for peripheral unit pixels of each individual unit pixel is used in determining a correction amount for each individual pixel signal from a unit pixel, and further wherein the first and second video signals for each unit pixel are used to determine whether a particular unit pixel is in a saturated state and performing correction by subtracting a sum of blooming amounts for a plurality of immediately adjacent unit pixels, each individual blooming amount being determined by multiplying a pixel signal by a coefficient.

2. A solid-state imaging device according to claim 1, wherein the first video signal maximum sensitivity level is higher than the second video signal sensitivity.

3. A solid-state imaging device according to claim 1, wherein the calculating unit obtains a first video signal imaged at the first sensitivity and plural second, third, . . . , and Nth video signals imaged at plural second sensitivities different from one another lower than the first sensitivity and calculates, for each of the first, second, . . . , and Nth video signals, the correction amount from a luminance value of one or plural video signals with lower sensitivity.

4. A solid-state imaging apparatus according to claim 1, wherein the judging unit sets, when video signals are imaged at the first sensitivity and the second sensitivity, an output value equivalent to incident light luminance of a unit pixel saturated at an end of the exposure period as a reference luminance value.

5. A solid-state imaging device according to claim 4, wherein the calculating unit subtracts the reference luminance value from a luminance value of the second video signal of a peripheral pixel and sets a value obtained by multiplying a result of the subtraction with a correction coefficient as the correction amount.

6. A solid-state imaging device according to claim 5, wherein the calculating unit applies, in calculating the correction amount, a different coefficient value as the correction coefficient according to a positional relation of the peripheral pixel with the correction pixel or a difference in a pixel characteristic between the correction pixel and the peripheral pixel.

7. A solid-state imaging device according to claim 5, wherein
    there are a plurality of the peripheral pixels, and
    the calculating means subtracts, for the respective plural peripheral pixels, the reference luminance value from luminance values of the second video signal of the peripheral pixels, calculates values obtained by multiplying results of the subtraction with a correction coefficient, and sets a sum of the values as the correction amount.

8. A solid-state imaging device according to claim 1, wherein the signal processing circuit is provided on an outside of a substrate on which the pixel array unit is formed.

9. A solid-state imaging device according to claim 1, wherein the signal processing circuit is provided in each unit column or each set of plural columns of a pixel array of the pixel array unit.

10. A solid-state imaging device according to claim 9, wherein the signal processing circuit has a storing circuit that stores luminance value of one or more unit pixels.

11. The solid-state imaging device according to claim 1, wherein the first and second video signals are generated by image forming light.

12. A signal processing circuit that obtains a first video signal having a first maximum sensitivity and a second video signal having a second maximum sensitivity and performs processing for combining the first and second video signals, the signal processing circuit comprising:
    judging unit for determining whether a particular pixel is saturated during an exposure period;
    calculating unit for calculating at least one correction amount for a specific pixel found to be saturated; and
    correcting unit for applying the correction amount to a video signal of a pixel immediate adjacent to the pixel found to be saturated to thereby correct a noise signal amount due to photo-charges leaking, and wherein the correction amount calculated by the calculating unit is based exclusively on a correction derived from one or more immediately adjacent pixels and only signal information for peripheral pixels of each individual pixel is used in determining a correction amount for each individual pixel signal, and further wherein the first and second video signals for each pixel are used to determine whether a particular pixel is in a saturated state and performing correction by subtracting a sum of blooming amounts for a plurality of immediately adjacent pixels, each individual blooming amount being determined by multiplying a pixel signal by a coefficient.

13. The solid-state imaging device according to claim 12, wherein the first and second video signals are generated by image forming light.

14. A signal processing method for combining first and second video signals in a solid-state imaging device, the signal processing method comprising:
    obtaining a first video signal and a second video for each of a plurality of pixels and combining the first and second video signals, the first and second video signals having different maximum sensitivity levels,
    determining whether a particular pixel is saturated during an exposure period;
    calculating a correction amount for a peripheral pixel immediately adjacent the saturated pixel; and
    applying the correction amount to a video signal of the peripheral pixel immediately adjacent the saturated pixel to thereby correct a noise signal amount due to photo-charges leaking, and wherein the calculated correction amount is based exclusively on a correction derived from one or more immediately adjacent pixels and only signal information for peripheral pixels of each individual pixel is used in determining a correction amount for each individual pixel signal, and further wherein the first and second video signals for each pixel are used to determine whether a particular pixel is in a saturated state and performing correction by subtracting a sum of blooming amounts for a plurality of immediately adjacent pixels, each individual blooming amount being determined by multiplying a pixel signal by a coefficient.

15. A signal processing method according to claim 14, wherein, in the calculating step, a first video signal imaged at a first sensitivity and plural second, third, . . . , and Nth video signals imaged at plural second sensitivities different from one another lower than the first sensitivity are obtained and, for each of the first, second, . . . , and Nth video signals, the correction amount is calculated from a luminance value of one or plural video signals with lower sensitivity.

16. A signal processing method according to claim 14, wherein, in the determining step, when video signals are imaged at a first sensitivity and a second sensitivity, an output value equivalent to incident light luminance of a pixel saturated at an end of the exposure period or temporarily during the exposure period is set as the reference luminance value.

17. A signal processing method according to claim 14, wherein, in the calculating step, a value obtained by multiplying a result of a subtraction with a correction coefficient is set as the correction amount.

18. A signal processing method according to claim 17, wherein, in the calculating step, in calculating the correction amount, a different coefficient value is applied as the correction coefficient according to a positional relation of the peripheral pixel with the correction pixel or a difference in a pixel characteristic between the correction pixel and the peripheral pixel.

19. A signal processing method according to claim 17, wherein there are a plurality of the peripheral pixels, and in the calculating step, for the respective plural peripheral pixels, the reference luminance value is subtracted from luminance values of the second video signal of the peripheral pixels, values obtained by multiplying results of the subtraction with a correction coefficient are calculated, and a sum of the values is set as the correction amount.

20. The solid-state imaging device according to claim 14, wherein the first and second video signals are generated by image forming light.

21. A signal processing circuit comprising:
circuitry for obtaining a first video signal and a second video for each of a plurality of pixels and combining the first and second video signals, the first and second video signals having different maximum sensitivity levels,
a judging unit that determines whether a particular pixel is saturated during an exposure period;
a calculating unit for calculating a correction amount for at least one pixel immediately adjacent the pixel found to be saturated; and
a correcting unit applying a correction amount to a video signal from at least one pixel immediately adjacent the pixel found to be saturated to thereby correct a noise signal amount due to photo-charges leaking, and wherein the correction amount calculated by the calculating unit is based exclusively on a correction derived from one or more immediately adjacent pixels and only signal information for peripheral pixels of each individual pixel is used in determining a correction amount for each individual pixel signal, and further wherein the first and second video signals for each pixel are used to determine whether a particular pixel is in a saturated state and performing correction by subtracting a sum of blooming amounts for a plurality of immediately adjacent pixels, each individual blooming amount being determined by multiplying a pixel signal by a coefficient.

* * * * *